(12) United States Patent
Iida et al.

(10) Patent No.: US 11,504,869 B2
(45) Date of Patent: *Nov. 22, 2022

(54) WORKPIECE PROCESSING DEVICE AND METHOD

(71) Applicant: Tokyo Seimitsu Co., Ltd., Tokyo (JP)

(72) Inventors: Takahiro Iida, Tokyo (JP); Teruhiko Nishikawa, Tokyo (JP); Tasuku Shimizu, Tokyo (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,538

(22) Filed: Feb. 26, 2021

(65) Prior Publication Data

US 2021/0178550 A1 Jun. 17, 2021

Related U.S. Application Data

(63) Continuation of application No. 17/270,388, filed as application No. PCT/JP2020/008941 on Mar. 3, 2020.

(30) Foreign Application Priority Data

| Mar. 6, 2019 | (JP) | 2019-040657 |
| Mar. 3, 2020 | (JP) | 2020-035650 |
| Mar. 3, 2020 | (JP) | 2020-035651 |

(51) Int. Cl.
  *B24B 51/00* (2006.01)
  *B26D 3/06* (2006.01)
  (Continued)

(52) U.S. Cl.
  CPC ............ *B26D 3/065* (2013.01); *B23Q 15/26* (2013.01); *B23Q 17/24* (2013.01); *B24B 19/02* (2013.01);
  (Continued)

(58) Field of Classification Search
  None
  See application file for complete search history.

(56) References Cited

U.S. PATENT DOCUMENTS 5,174,270 A * 12/1992 Katayama ............ B23D 47/005
                                                              125/13.02
5,432,394 A    7/1995 Ohne
(Continued)

FOREIGN PATENT DOCUMENTS

JP    55-169311 U    12/1980
JP    6-320392 A    11/1994
(Continued)

OTHER PUBLICATIONS

Machine Generated English Translation of the claims of JP2017052065. Published Mar. 16, 2017. (Year: 2017).*
(Continued)

*Primary Examiner* — Sylvia MacArthur
(74) *Attorney, Agent, or Firm* — Birch, Stewart, Kolasch & Birch, LLP

(57) ABSTRACT

A workpiece processing device includes a workpiece supporting unit configured to support a workpiece so that the workpiece is rotatable around a first axis parallel to a central axis of the workpiece, a cutting unit having a blade configured to cut a surface of the workpiece, a detecting unit configured to calculate a position of a vertex of the surface in a direction along a second axis which is perpendicular to the first axis and parallel to the blade, and a control unit configured to control the workpiece supporting unit so that a cutting position on the surface is located at a vertex in the direction along the second axis, and relatively move the workpiece supporting unit and the cutting unit so that an incision direction of the blade is on a plane defined by the
(Continued)

central axis and the cutting position, thereby forming a groove at the cutting position.

4 Claims, 18 Drawing Sheets

(51) Int. Cl.
    *B26D 5/00*         (2006.01)
    *B26D 7/01*         (2006.01)
    *B24B 19/02*        (2006.01)
    *B23Q 15/26*        (2006.01)
    *B23Q 17/24*        (2006.01)
    *B23C 3/28*         (2006.01)

(52) U.S. Cl.
    CPC ............... *B24B 51/00* (2013.01); *B26D 5/00* (2013.01); *B26D 7/01* (2013.01); *B23C 3/28* (2013.01); *Y10T 83/0304* (2015.04)

(56) References Cited

U.S. PATENT DOCUMENTS

| | | | | |
|---|---|---|---|---|
| 5,582,536 | A | * | 12/1996 | Kagamida ............... B24B 9/065 125/11.03 |
| 6,142,138 | A | * | 11/2000 | Azuma ................. B23D 59/002 125/13.01 |
| 6,422,227 | B1 | * | 7/2002 | Kobayashi ........... B28D 5/0058 125/13.01 |
| 6,583,032 | B1 | * | 6/2003 | Ishikawa ................ H01L 21/78 438/462 |
| 6,762,846 | B1 | | 7/2004 | Poris |
| 8,267,625 | B2 | | 9/2012 | Hughes |
| 9,010,225 | B2 | * | 4/2015 | Hojo ....................... B24B 49/12 83/365 |
| 2010/0011920 | A1 | | 1/2010 | Akiyama et al. |
| 2012/0097002 | A1 | | 4/2012 | Thiedig |

FOREIGN PATENT DOCUMENTS

| | | | |
|---|---|---|---|
| JP | 7-7808 U | | 2/1995 |
| JP | 11-347930 A | | 12/1999 |
| JP | 11347930 A | * | 12/1999 |
| JP | 2010-23159 A | | 2/2010 |
| JP | 2010-105128 A | | 5/2010 |
| JP | 2017-52065 A | | 3/2017 |

OTHER PUBLICATIONS

Machine Generated English Translation of the description of JP2017052065. Published Mar. 16, 2017. (Year: 2017).*
Machine Generated English Translation of the claims of JP2010105128. Published May 13, 2010. (Year: 2010).*
Machine Generated English Translation of the description of JP2010105128. Published May 13, 2010. (Year: 2010).*
Machine Generated English Translation of the claims of JP11-347930A. Published Dec. 21, 1999. (Year: 1999).*
Machine Generated English Translation of the specification of JP11-347930A. Published Dec. 21, 1999. (Year: 1999).*
Machine Generated English Translation of the abstractor JP11-347930A. Published Dec. 21, 1999. (Year: 1999).*
Decision to grant a patent in JP2020-035651 dated Apr. 14, 2020.
Decision to grant a patent in JP2020-068910 dated May 28, 2020.
Decision to grant a patent in JP2020-086099 dated Jul. 8, 2020.
International Preliminary Report on Patentability for PCT/JP2020/008941 (PCT/IPEA/409), dated Sep. 30, 2020.
International Search Report for PCTAP2020/008941 (PCT/ISA/210) dated Apr. 28, 2020.
Notice of reasons for refusal in JP2020-035651 dated Mar. 16, 2020.
Notice of reasons for refusal in JP2020-068910 dated Apr. 17, 2020.
Notice of reasons for refusal in JP2020-086099 dated Jun. 1, 2020.
Written Opinion of the International Searching Authority for PCT/JP2020/008941 (PCT/ISA/237) dated Apr. 28, 2020.
U.S. Office Action for Application No. 17/187,501, dated May 6, 2021.
Office Action dated Oct. 1, 2021 in copending U.S. Appl. No. 17/187,501.
Office Action dated Oct. 1, 2021 in copending U.S. Appl. No. 17/334,337.
Office Action dated Oct. 20, 2021 in copending U.S. Appl. No. 17/270,388.
U.S. Office Action for U.S. Appl. No. 17/187,501, dated Feb. 9, 2022.
U.S. Office Action for U.S. Appl. No. 17/270,388. dated Feb. 9, 2022.
U.S. Office Action for U.S. Appl. No. 17/334,337, dated Feb. 9, 2022.
U.S. Notice of Allowance for U.S. Appl. No. 17/187,501, dated Jun. 7, 2022.
U.S. Office Action for U.S. Appl. No. 17/270,388, dated Jul. 20, 2022.
U.S. Office Action for U.S. Appl. No. 17/334,337, dated Jul. 20, 2022.
U.S. Supplemental Notice of Allowability for U.S. Appl. No. 17/187,501, dated Jul. 20, 2022.

* cited by examiner

WORKPIECE PROCESSING DEVICE AND METHOD

This application is a Continuation of U.S. application Ser. No. 17/270,388, filed Feb. 22, 2021, which is the National Phase of PCT International Application PCT/JP2020/008941, filed Mar. 3, 2020, which claims priority under 35 U.S.C. 119(a) to Japanese Patent Application No. 2019-040657, filed Mar. 6, 2019, Japanese Patent Application No. 2020-035650, filed Mar. 3, 2020 and Japanese Patent Application No. 2020-035651, filed Mar. 3, 2020. Each of the above applications is hereby expressly incorporated by reference, in its entirety, into the present application.

TECHNICAL FIELD

The presently disclosed subject matter relates to workpiece processing device and method, and relates to workpiece processing device and method for processing a cylindrical-shape workpiece.

BACKGROUND ART

When a cylindrical-shape workpiece is processed, the workpiece is supported so as to be rotatable around a workpiece rotation axis, and ground by using a working tool such as a grindstone. For example. Patent Literature 1 discloses a grinder for grinding a cylindrical-shape workpiece by bringing a working tool into contact with a cylindrical surface or end surface of the workpiece (a surface orthogonal to the workpiece rotation axis) while causing the cylindrical-shape workpiece to rotate around the workpiece rotation axis.

CITATION LIST

Patent Literature

{PTL 1} Japanese Patent Application Laid-Open No. 2010-105128

SUMMARY OF THE INVENTION

Technical Problem

There is a case where the surface of a cylindrical-shape workpiece is subjected to processing of forming a groove extending in the length direction (central axis direction) of the cylinder (hereinafter referred to as grooving). For example, when a convex type ultrasonic probe is created, a layer of a piezoelectric element (for example, lead zirconate titanate) having a driving electrode is formed on the surface of a cylindrical-shape packing material, and the grooving is performed on the layer of the piezoelectric element to cut the layer of the piezoelectric element into a plurality of elements, thereby creating an ultrasonic probe in which the plurality of elements for transmitting and receiving ultrasonic waves are formed on the surface of the packing material.

When the grooving as described above is performed, a workpiece is first rotatably attached to a workpiece supporting unit. Then, the workpiece is rotated to be positioned so that a processing position of the workpiece (a target position for forming a groove, hereinafter referred to as a cutting position) and a blade face each other, and the blade performs incision toward the central axis of the workpiece to form one groove. Repetition of this positioning and cutting makes it possible to form a groove at each cutting position on the surface of the workpiece.

In the grooving as described above, it is required that the incision direction of the blade is perpendicular to the surface of the workpiece. In other words, the incision direction of the blade and the radial direction of the workpiece (the normal direction of the surface (cylindrical surface) of the workpiece) are required to match each other. If the incision direction of the blade is inclined with respect to the radial direction of the workpiece in the ultrasonic probe, the processing accuracy of the plurality of elements is deteriorated, and characteristics such as transmission and reception characteristics of ultrasonic waves are varied among the elements. Variations in characteristics among the elements may cause noise in ultrasonic images.

In order to make the incision direction of the blade and the radial direction of the workpiece match each other, it is considered that the central axis of the cylindrical-shape workpiece and the workpiece rotation axis are made to match each other when the workpiece is attached to the workpiece supporting unit. However, when the workpiece attaching accuracy (mechanical accuracy) cannot be sufficiently secured, there is a problem that the center axis of the workpiece and the workpiece rotation axis deviate from each other, resulting in deterioration of the processing accuracy of the grooving.

Further, when the central axis of the workpiece and the rotation axis of the workpiece are made to match each other, the size of a workpiece which can be processed is restricted by, for example, the distance between the workpiece rotation axis and the blade, movable ranges of the workpiece supporting unit and the blade, etc. In order to process a large-size workpiece, it is necessary to secure the distance between the workpiece rotation axis and the blade and the movable ranges of the workpiece supporting unit and the blade, which causes a problem that the size of the device and the cost increase.

The presently disclosed subject matter has been made in view of such circumstances, and has an object to provide workpiece processing device and method that can perform, with high accuracy, grooving on the surfaces of workpieces which have cylindrical-shape surfaces and various shapes and sizes.

Solution to Problem

In order to solve the foregoing problem, a workpiece processing device according to a first aspect of the presently disclosed subject matter is a work processing device for processing a workpiece having a cylindrical-shape surface, which comprises: a workpiece supporting unit for supporting the workpiece so that the workpiece is rotatable around a first axis parallel to a central axis of the workpiece; a cutting unit having a blade for cutting a surface of the workpiece supported by the workpiece supporting unit; a detecting unit for calculating a position of a vertex of the surface of the workpiece in a direction along a second axis which is perpendicular to the first axis and parallel to the blade; and a control unit for controlling the workpiece supporting unit so that a cutting position on the surface of the workpiece is located at a vertex in the direction along the second axis, and relatively moving the workpiece supporting unit and the cutting unit so that an incision direction of the blade is on a plane defined by the central axis of the workpiece and the cutting position on the surface of the workpiece, thereby forming a groove at the cutting position.

According to the first aspect, even when the central axis of the workpiece and the first axis (workpiece rotation axis) do not match each other in grooving on the surface of the cylindrical-shape workpiece, it is possible to perform grooving with high accuracy because the incision direction of the blade can be kept perpendicular to the surface of the workpiece. Further, according to the first aspect, since it is unnecessary that the central axis of the workpiece and the rotation axis of the workpiece match each other, the attachment posture of the workpiece can be adjusted according to the shape and size of the workpiece, and the workpiece processing device can be applied to workpieces having various sizes.

A workpiece processing device according to a second aspect of the presently disclosed subject matter further comprises, in the first aspect, a calculating unit for calculating positions of at least three vertices in the direction along the second axis at at least three rotation positions when the workpiece is rotated around the first axis, calculating a locus of a center of the workpiece based on the positions of the at least three vertices when the workpiece is rotated around the first axis, and calculating the cutting position based on a position of the center of the workpiece and a radius of the workpiece.

A workpiece processing device according to a third aspect of the presently disclosed subject matter is configured in the second aspect so that the detecting unit calculates a cutting reference position on the surface of the workpiece when the cutting reference position is located at the vertex in the direction along the second axis, and the calculating unit calculates the position of the center of the workpiece and the radius of the workpiece based on calculation results of the positions of the at least three vertices and the cutting reference position.

A workpiece processing device according to a fourth aspect of the presently disclosed subject matter further comprises, in any of the first to third aspects, a camera capable of imaging the surface of the workpiece, wherein the detecting unit detects a vertex of the surface of the workpiece based on an image captured by moving the camera in a direction along a third axis perpendicular to the first axis while the camera is focused on a position farther than the vertex of the workpiece.

A workpiece processing device according to a fifth aspect of the presently disclosed subject matter further comprises, in any of the first to fourth aspects, a sensor unit for measuring a height position of the cutting position on the surface of the workpiece, wherein the control unit adjusts an incision depth of the blade based on a measurement result of the height position of the cutting position.

A workpiece processing device according to a sixth aspect of the presently disclosed subject matter is a workpiece processing device for processing a workpiece having an outwardly-convex curved-surface-shape surface, comprises; a workpiece supporting unit for supporting the workpiece so that the workpiece is rotatable around a first axis; a cutting unit having a blade for cutting the surface of the workpiece supported by the workpiece supporting unit; a sensor unit for measuring the surface of the workpiece; a calculating unit for calculating a surface shape of the workpiece on a plane perpendicular to the first axis based on a measurement result of the surface of the workpiece; and a control unit for relatively moving the workpiece supporting unit and the cutting unit based on the surface shape of the workpiece calculated by the calculating unit, thereby forming one or more grooves on the surface of the workpiece.

A workpiece processing device according to a seventh aspect of the presently disclosed subject matter is configured in the sixth aspect so that the calculating unit calculates a cutting position at which the groove is formed on the surface of the workpiece based on the surface shape of the workpiece and an interval of the grooves to be formed on the surface of the workpiece, and the control unit relatively moves the workpiece supporting unit and the cutting unit based on the cutting position, thereby forming the groove at the cutting position.

A workpiece processing device according to an eighth aspect of the presently disclosed subject matter further comprises, in the sixth or seventh aspect, a detecting unit for calculating a position of a vertex of the surface of the workpiece in a direction along a second axis which is perpendicular to the first axis and parallel to the blade, wherein the detecting unit detects positions of vertices at a plurality of rotation positions to which the workpiece is rotated around the first axis from a reference rotation position of the workpiece by predetermined rotation angles, and the calculating unit calculates positions of a plurality of points on the surface of the workpiece at the reference rotation position based on the positions of the vertices at the plurality of rotation positions and the rotation angles from the reference rotation positions, and calculates a surface shape function representing a surface shape of the workpiece based on the positions of the plurality of points.

A workpiece processing device according to a ninth aspect of the presently disclosed subject matter is a workpiece processing device for processing a workpiece having an outwardly-convex curved-surface-shape surface, comprises: a workpiece supporting unit for supporting the workpiece so that the workpiece is rotatable around a first axis, a cutting unit having a blade for cutting the surface of the workpiece supported by the workpiece supporting unit; a sensor unit for measuring the surface of the workpiece, a calculating unit for calculating a surface shape of the workpiece on a plane perpendicular to the first axis based on a measurement result of the surface of the workpiece; and a control unit for rotating the workpiece around the first axis based on the surface shape of the workpiece and a cutting position at which a groove is formed on the surface of the workpiece so that the cutting position matches a vertex in a direction along a second axis which is perpendicular to the first axis and parallel to the blade, and relatively moving the workpiece supporting unit and the cutting unit, thereby forming a groove at the cutting position.

A workpiece processing device according to a tenth aspect of the presently disclosed subject matter is configured in the ninth aspect so that the calculating unit calculates a normal line to the surface of the workpiece at the cutting position based on the surface shape of the workpiece, and the control unit rotates the workpiece around the first axis so that the normal line is parallel to a direction along a second axis which is perpendicular to the first axis and parallel to the blade, and relatively moves the workpiece supporting unit and the cutting unit, thereby forming a groove at the cutting position.

A workpiece processing device according to an eleventh aspect of the presently disclosed subject matter is configured in the ninth aspect so that the calculating unit calculates a tangent line to the surface of the workpiece at the cutting position based on the surface shape of the workpiece, and the control unit rotates the workpiece around the first axis so that the tangent line is perpendicular to a direction along a second axis which is perpendicular to the first axis and parallel to the blade, and relatively moves the workpiece supporting unit and the cutting unit, thereby forming a groove at the cutting position.

A workpiece processing device according to a twelfth aspect of the presently disclosed subject matter further comprises, in any of the first to eleventh aspects, an adjusting mechanism for adjusting a fixing surface on which the workpiece is fixed in the workpiece supporting unit, and a cut-feeding direction of the blade.

A workpiece processing method according to a thirteenth aspect of the presently disclosed subject matter is a workpiece processing method for processing a workpiece having a cylindrical-shape surface, which comprises: a step of supporting the workpiece on a workpiece supporting unit so that the workpiece is rotatable around a first axis parallel to a central axis of the workpiece; a step of calculating a position of a vertex of the surface of the workpiece in a direction along a second axis which is perpendicular to the first axis and parallel to a blade; and a step of controlling the workpiece supporting unit so that a cutting position on the surface of the workpiece is located at a vertex in the direction along the second axis, and relatively moving the workpiece supporting unit and the blade so that an incision direction of the blade is on a plane defined by the central axis of the workpiece and the cutting position on the surface of the workpiece, thereby forming a groove at the cutting position.

A workpiece processing method according to a fourteenth aspect of the presently disclosed subject matter is a workpiece processing method for processing a workpiece having an outwardly-convex curved-surface-shape surface, comprises: a step of supporting the workpiece on a workpiece supporting unit so that the workpiece is rotatable around a first axis; a step of measuring the surface of the workpiece by a sensor unit and calculating a surface shape of the workpiece on a plane perpendicular to the first axis based on a measurement result of the surface of the workpiece; and a step of relatively moving the workpiece supporting unit and the blade based on the surface shape of the workpiece, thereby forming a groove on the surface of the workpiece.

A workpiece processing method according to a fifteenth aspect of the presently disclosed subject matter is a workpiece processing method for processing a workpiece having an outwardly-convex curved-surface-shape surface, which comprises: a step of supporting the workpiece on a workpiece supporting unit so that the workpiece is rotatable around a first axis; a step of measuring the surface of the workpiece by a sensor unit; a step of calculating a surface shape of the workpiece on a plane perpendicular to the first axis based on a measurement result of the surface of the workpiece; and a step of rotating the workpiece around the first axis based on the surface shape of the workpiece and a cutting position at which a groove is formed on the surface of the workpiece so that the cutting position matches a vertex in a direction along a second axis which is perpendicular to the first axis and parallel to the blade, and relatively moving the workpiece supporting unit and the cutting unit, thereby forming a groove at the cutting position.

Advantageous Effects of the Invention

According to the presently disclosed subject matter, when grooving is performed on the surface of a cylindrical-shape workpiece, it is possible to form a groove with high accuracy without making the central axis of the workpiece and the workpiece rotation axis match each other. Further, according to the presently disclosed subject matter, since it is not necessary to make the central axis of the workpiece and the workpiece rotation axis match each other, the attachment posture of the workpiece can be adjusted according to the shape and size of the workpiece, which makes it possible to process workpieces having various sizes. Further, according to the presently disclosed subject matter, regardless of whether the surface of the workpiece has a cylindrical shape or non-cylindrical shape, the incision position and depth of the blade can be adjusted with high accuracy by calculating the surface shape.

DESCRIPTION OF EMBODIMENTS

Hereinafter, embodiments of workpiece processing device and method according to the presently disclosed subject matter will be described with reference to the accompanying drawings.

[Workpiece Processing Device]

Figure 1:
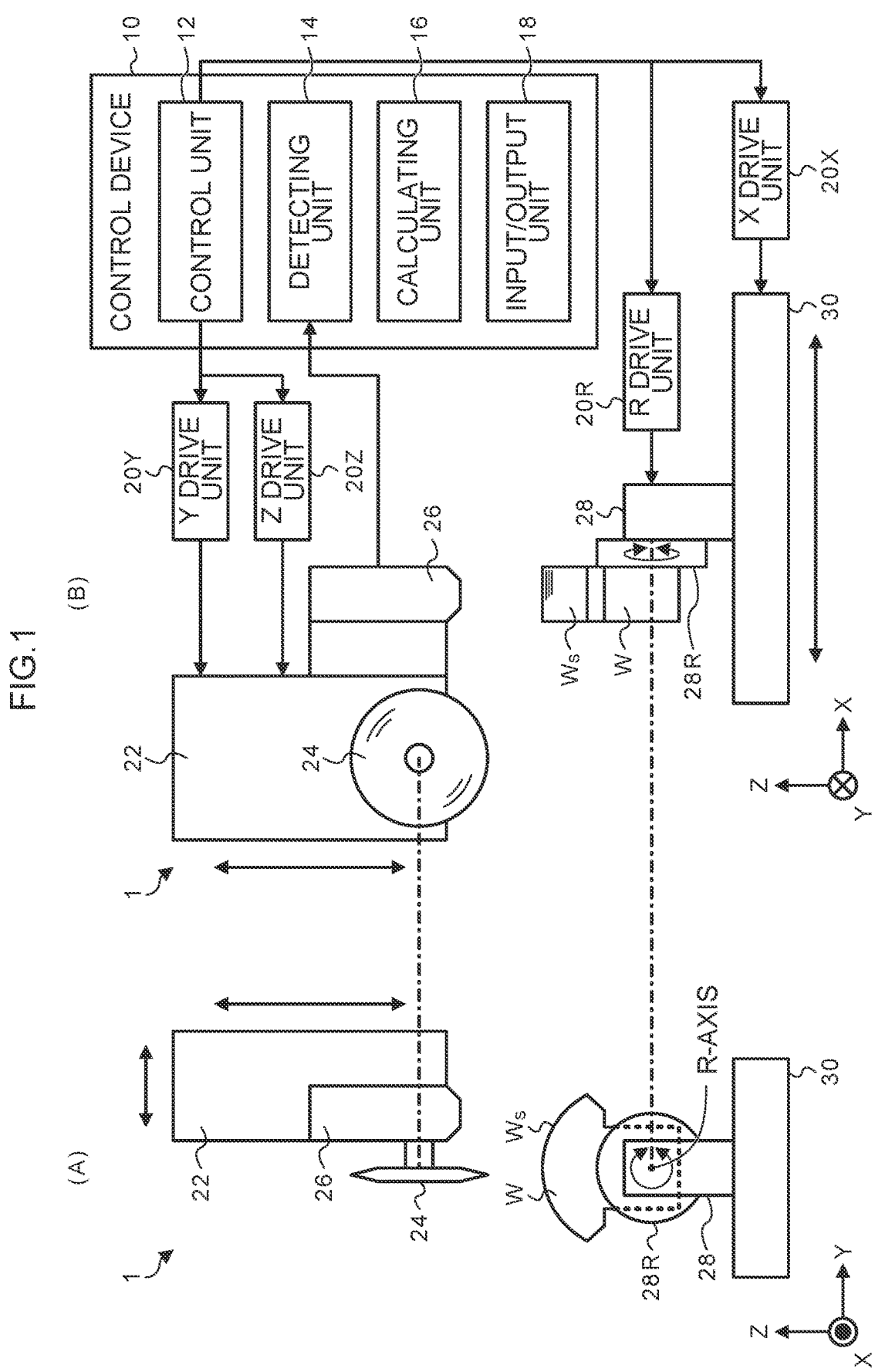
FIG. 1 is a diagram showing a workpiece processing device according to an embodiment of the presently disclosed subject matter.

First, a workpiece processing device according to an embodiment of the presently disclosed subject matter will be described with reference to FIG. 1, and (A) and (B) portions of FIG. 1 are a front view and a side view of the workpiece processing device, respectively. Here, the following description will be made by using a three-dimensional rectangular coordinate system. The workpiece rotation axis (R-axis, first axis) is assumed to be parallel to an X-axis.

As illustrated in FIG. 1, the workpiece processing device 1 includes a control device 10, an X drive unit 20X, a Y drive unit 20Y, a Z drive unit 20Z, an R drive unit 20R, a cutting unit 22, a blade 24, a sensor unit 26, a workpiece supporting unit 28 and a workpiece table 30. In the (A) portion of FIG. 1, the control device 10 and the like are omitted for simplification of the drawings.

The workpiece table 30 can be moved in an X direction by the X drive unit 20X including a motor, a ball screw and the like. The workpiece supporting unit 28 is provided on the upper surface of the workpiece table 30. A rotary table 28R is attached to the workpiece supporting unit 28. The rotary table 28R is rotatable around the workpiece rotation axis (R-axis) by the R drive unit 20R including the motor and the like. The rotary table 28R includes a mechanism for fixing a workpiece W (for example, a clamp mechanism). The above configuration enables the workpiece W to rotate around the workpiece rotation axis (R-axis) and slide in the X direction while the workpiece W is fixed and supported by the rotary table 28R.

The cutting unit (cutting part) 22 is movable in Y and Z directions via a Y table and a Z table (not illustrated). The Y table is provided on a side surface of a Y base (not illustrated). The Y table is movable in the Y direction by the Y drive unit 20Y including a motor, a ball screw and the like. A Z table (not illustrated) is attached to the Y table. The Z table is movable in the Z direction by the Z drive unit 20Z including a motor, a ball screw and the like.

The cutting unit 22 is fixed to the Z table. The blade 24 is attached to the cutting unit 22. The blade 24 is a disk-shaped cutting blade, which can be rotated by a spindle motor (not illustrated). The blade 24 is held in parallel to a ZX plane. As the blade 24 is used an electrodeposition blade obtained by electrodepositing diamond abrasive grains or CBN (Cubic form of Boron Nitride) abrasive grains with nickel, a resin blade obtained by bonding diamond abrasive grains or CBN (Cubic form of Boron Nitride) abrasive grains with resin, or the like. The blade 24 can be moved in the Y direction by the Y drive unit 20Y, and also can perform incision-feeding in the Z direction by the Z drive unit 20Z.

The cutting unit 22 is provided with the sensor unit 26. The sensor unit 26 includes a displacement sensor for measuring the distance to each point on the surface $W_S$ of the workpiece W. As the displacement sensor may be used, for example, a laser displacement sensor, an optical or contact type displacement sensor, a TOF (Time of Flight) camera, or the like.

Further, the sensor unit 26 includes an imaging device. The imaging device includes a microscope, a camera, and the like, and it images the surface $W_S$ of the workpiece W in order to perform alignment of the workpiece W and evaluation of the processing state of the workpiece W. For example, an area sensor camera can be used as the camera.

The above configuration makes it possible to perform grooving on the surface $W_S$ of the workpiece W while rotating the workpiece W having the cylindrical-shape surface $W_S$ around the rotation axis R for alignment.

Note that in the present embodiment, the workpiece table 30 is allowed to move in the X direction and the cutting unit 22 is allowed to move in the Y and Z directions, but the moving directions of the workpiece table 30 and the cutting unit 22 are not limited to these directions. For example, the workpiece table 30 may move in the Y and Z directions, and the cutting unit 22 may move in the Z and X directions. In other words, the workpiece table 30 and the cutting unit 22 may be relatively movable along the X, Y and Z directions.

Figure 2:
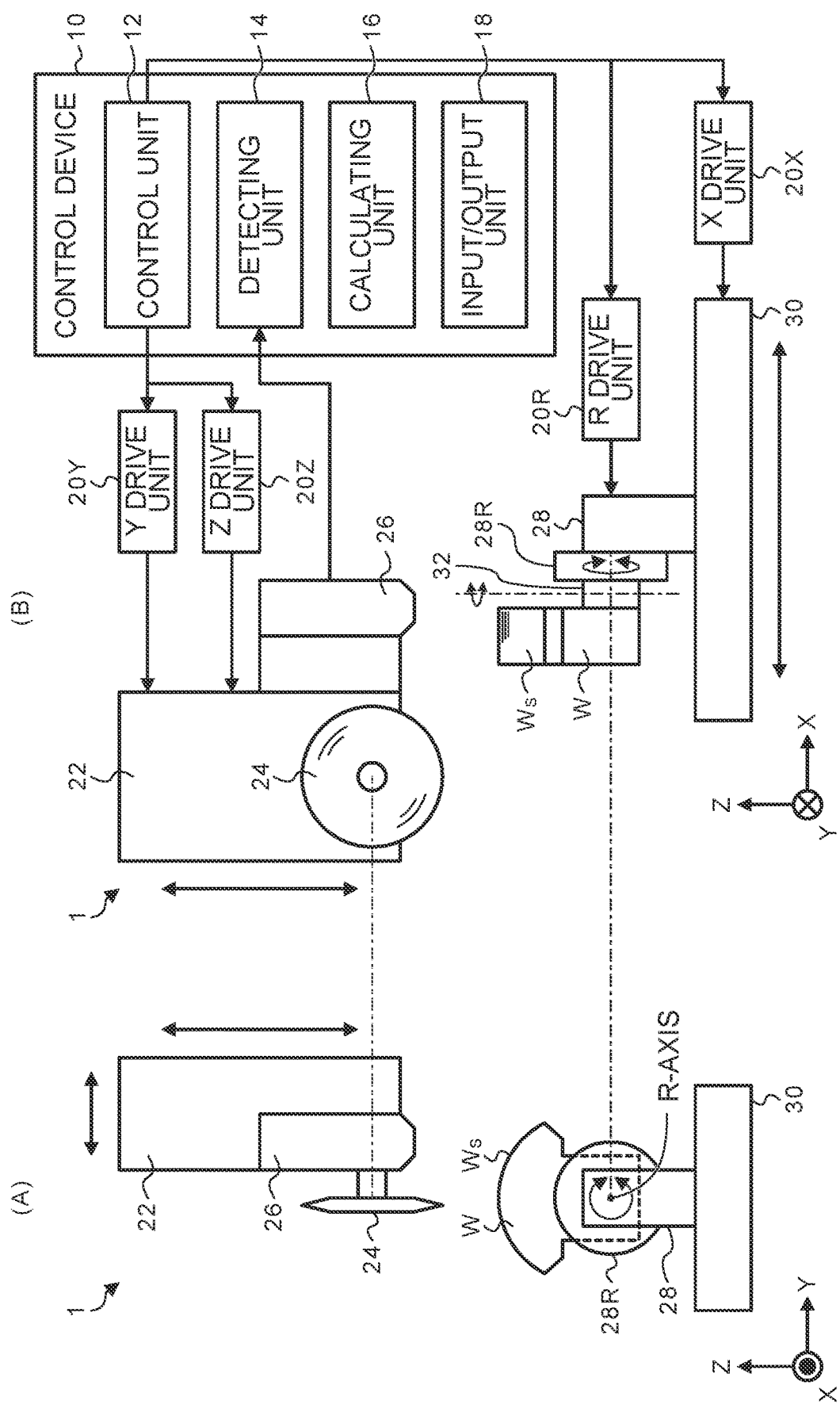
FIG. 2 is a diagram showing another example of the workpiece processing device.

Further, the workpiece processing device 1 may include an adjusting mechanism for adjusting a fixing surface on which the workpiece W is fixed on the rotary table 28R and the cutting direction of the workpiece W (the cutting feeding direction of the blade 24, X-axis). A manual or automatic tilting stage mechanism 32 for tilting the workpiece W between the workpiece W and the rotary table 28R may be used as the adjusting mechanism as illustrated in FIG. 2. Furthermore, as the adjusting mechanism may be used, for example, a mechanism for manually or automatically rotating the workpiece supporting unit 28 around an axis (for example, the Y-axis or the Z-axis) perpendicular to the X-axis (R-axis) of the workpiece processing device 1. As a result, the cutting feeding direction of the blade 24 for the workpiece W and the X-axis (R-axis) of the workpiece processing device 1 can be made parallel to each other.

In the present embodiment, the sensor unit 26 is provided in the cutting unit 22 so as to be movable integrally with the cutting unit 22, but the sensor unit 26 and the cutting unit 22 may be movable separately from each other.

Next, a control system of the workpiece processing device 1 will be described. The control device 10 controls the operation of each part of the workpiece processing device 1. The control device 10 can be implemented by a general-purpose computer such as a personal computer or a microcomputer.

The control device 10 includes CPU (Central Processing Unit), ROM (Read Only Memory). RAM (Random Access Memory), a storage device (for example, a hard disk or the like), etc. In the control device 10, various programs such as a control program stored in the ROM are expanded in the RAM, and the programs expanded in the RAM are executed by the CPU to implement the function of each unit of the control device 10.

As illustrated in FIG. 1, the control device 10 functions as a control unit 12, a detecting unit 14, and a calculating unit 16.

The control unit 12 accepts an operation input from an operator via an input/output unit 18 to control each unit of the control device 10, and controls the operation of the X drive unit 20X, the Y drive unit 20Y, the Z drive unit 20Z, and the R drive unit 20R.

The input/output unit 18 includes an operation member (for example, a keyboard, a pointing device, etc.) and a display unit for inputting operations.

The detecting unit 14 acquires data of a measurement result of the surface $W_S$ of the workpiece W from the displacement sensor of the sensor unit 26, and calculates the distance to the surface $W_S$ of the workpiece W. Further, the detecting unit 14 can calculate the height at each position on the surface $W_S$ of the workpiece W, and calculate the coordinate of a vertex (a point having the maximum Z coordinate) in the Z-axis (second axis) direction of the workpiece W.

The calculating unit 16 calculates a correction circle C described later, the coordinate of a processing position (cutting position), etc. based on the vertex of the surface $W_S$ of the workpiece W.

Figure 3:
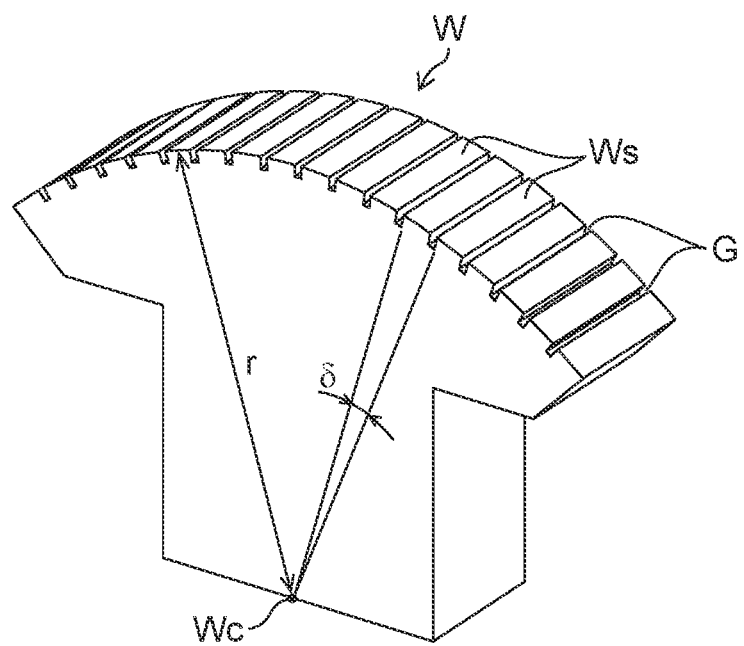
FIG. 3 is a perspective view showing a workpiece after grooving.

When grooving is performed on a plate-shaped workpiece W having a cylindrical-shape surface $W_S$ as illustrated in FIG. 3, the control unit 12 controls the Y drive unit 20Y and the R drive unit 20R to perform alignment between the cutting position of the surface $W_S$ of the workpiece W calculated by the calculating unit 16 and the blade 24. Further, the control unit 12 controls the X drive unit 20X to perform cut-feeding in the X direction of the workpiece table 30 while controlling the Z drive unit 20Z to perform incision-feeding in the Z direction of the blade 24. As a result, as illustrated in FIG. 3, grooves G each having a predetermined depth extending toward the center $W_C$ of the cylindrical surface of the workpiece W are formed on the cylindrical-shape surface $W_S$ of the workpiece W.

[Specific Example of Grooving]

Figure 4:
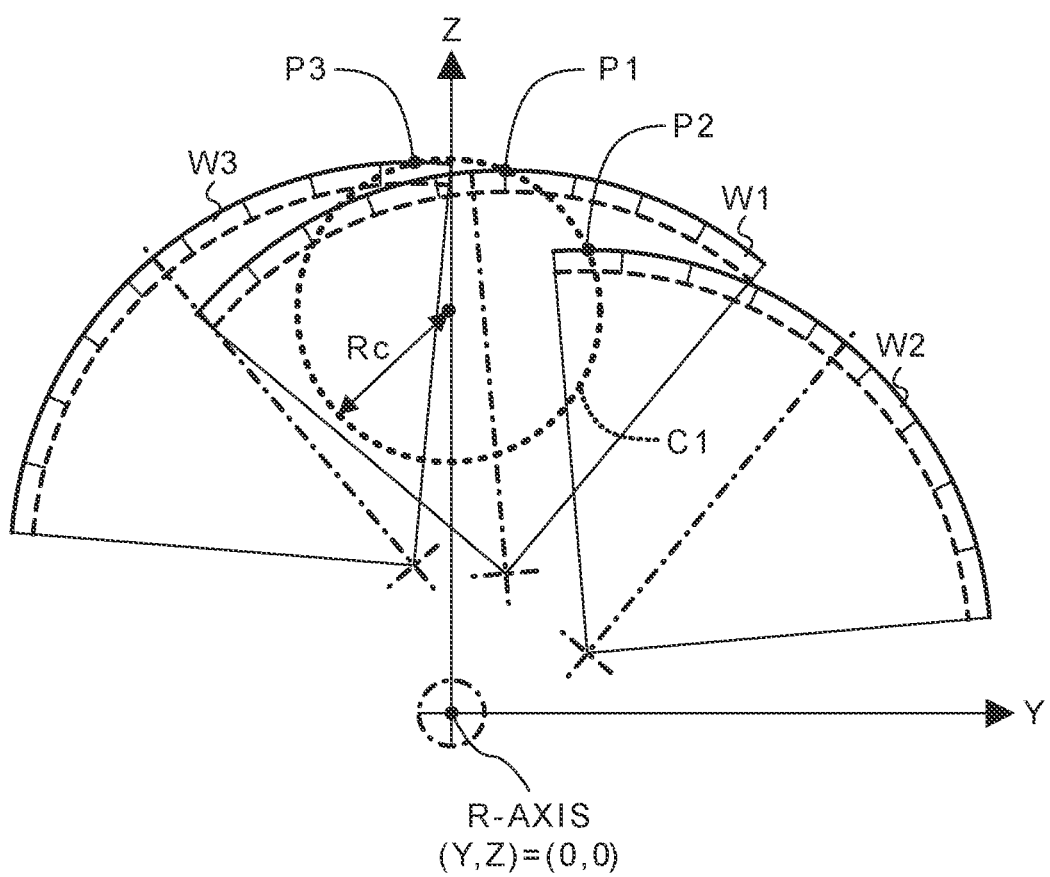
FIG. 4 is a diagram for illustrating a procedure of grooving.
Figure 5:
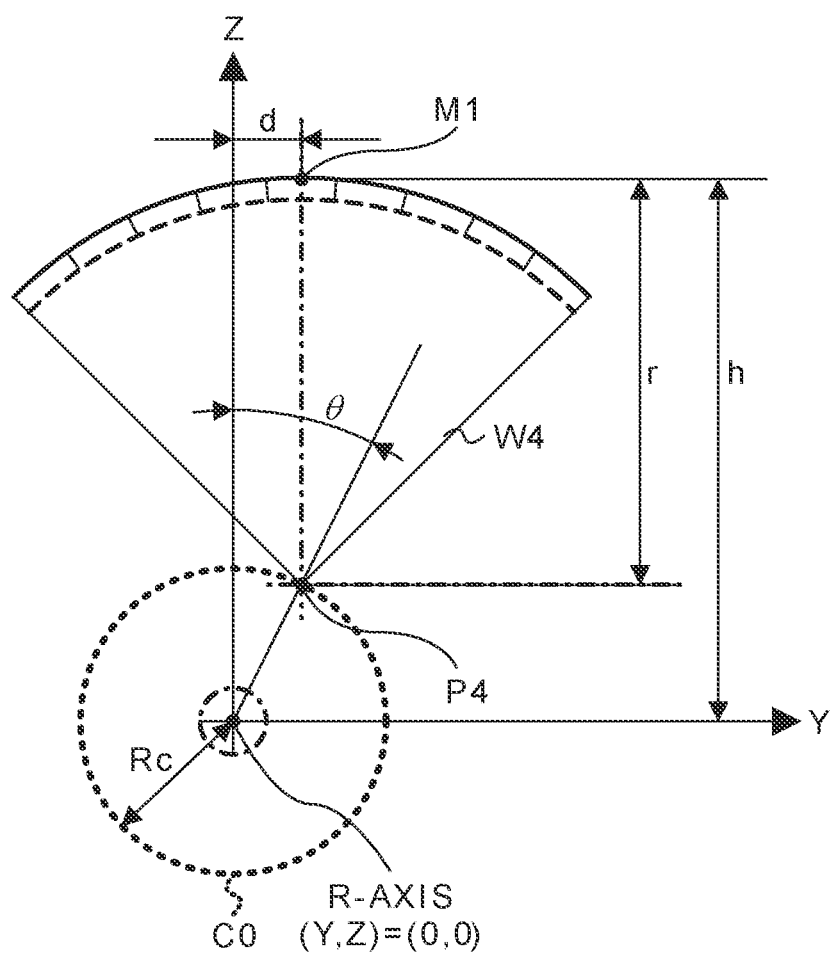
FIG. 5 is a diagram for illustrating the procedure of grooving.
Figure 6:
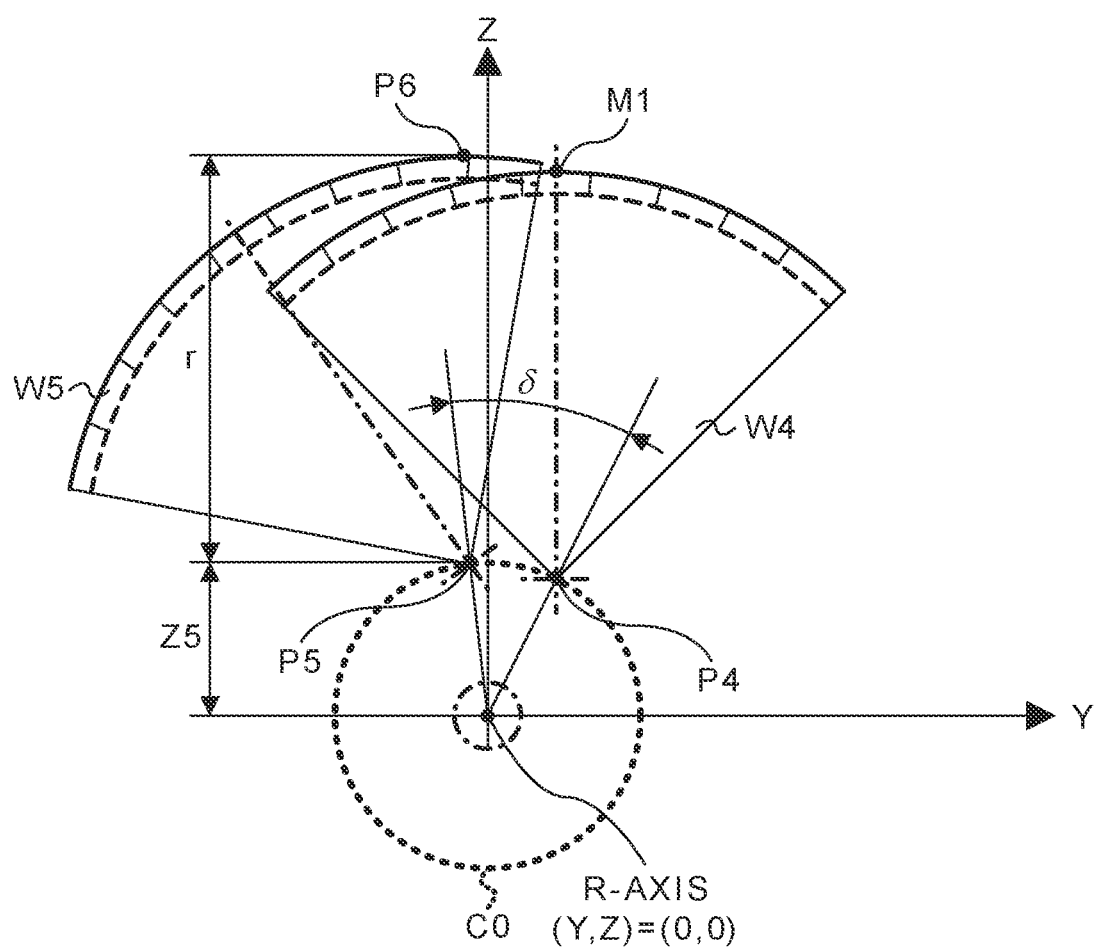
FIG. 6 is a diagram for illustrating the procedure of grooving.

Next, a procedure of grooving will be described with reference to FIGS. 4 to 6. FIGS. 4 to 6 are diagrams for illustrating the procedure of grooving.

In the following description, a case where the grooves G are formed at angular intervals of $\delta$ in the circumferential direction of the surface $W_S$ of the workpiece W ill be described. Further, FIGS. 4 to 6 show the workpiece W which is simplified in a fan shape connecting the surface $W_S$ and the center of the workpiece W. Further, the position of the workpiece rotation axis (R-axis) is set to an origin (Y, Z)=(0,0).

First, the workpiece W having the cylindrical-shape surface $W_S$ is attached to the rotary table 28R to calculate a correction circle C1 to be used for alignment of the cutting position of the workpiece W. In the present embodiment, when the workpiece W is attached to the rotary table 28R, the central axis of the workpiece W and the workpiece rotation axis (R-axis) only need to be parallel to each other, and are not required to match each other.

When the correction circle C1 is calculated, as illustrated in FIG. 4, the workpiece W is rotated around the R-axis to determine the coordinates of vertices of the workpiece W (points having maximum Z coordinates) at at least three rotation positions. When the coordinate of the vertex of the workpiece W at each rotation position is determined, the control unit 12 controls the Y drive unit 20Y to scan the surface $W_S$ of the workpiece W by using the displacement sensor of the sensor unit 26 and measures the distance from the displacement sensor to the surface $W_S$ of the workpiece W at each scanning position on the surface $W_S$ of the workpiece W.

The detecting unit 14 calculates the Z coordinate of each scanning position from data of the distance from the displacement sensor to the surface $W_S$ of the workpiece W at each scanning position. Further, the detecting unit 14 calculates the shape of the surface $W_S$ of the workpiece W at each scanning position, and calculates the coordinates of the vertex having the maximum Z coordinate on the surface $W_S$ of the workpiece W. In the example illustrated in FIG. 4, the coordinates of vertices P1, P2 and P3 of the workpiece W at three rotation positions W1, W2 and W3 are designated by (Y1, Z1), (Y2, Z2) and (Y3, Z3), respectively.

The calculating unit 16 calculates the correction circle C1 which is a circle (a circumscribed circle of a triangle formed by three points P1, P2, and P3) passing through the three points P1 (Y1, Z1), P2 (Y2, Z2), and P3 (Y3, Z3). The correction circle C1 is a locus of the vertices of the workpiece W when the workpiece W is rotated around the R-axis. The calculating unit 16 determines the intersection point of perpendicular bisectors of line segments connecting respective two of the three points P1, P2, and P3 as the center of the correction circle C1. Further, the calculating unit 16 calculates the distance between the center of the correction circle C1 and any of the three points P1, P2, and P3 as the radius Rc of the correction circle C1.

Here, when the central axis of the workpiece W and the R-axis match each other, the following calculation is not performed, the blade 24 is arranged just above the R-axis, that is, in parallel to a plane of Y=0, the workpiece W is rotated around the R-axis by each angle $\delta$ to perform alignment so that the cutting position is set to the position of Y=0, and then cutting is performed. As a result, a groove G having a predetermined depth extending toward the center $W_C$ of the cylindrical surface of the workpiece W can be formed on the cylindrical-shape surface $W_S$ of the workpiece W.

On the other hand, when the center $W_C$ of the cylindrical-shape surface $W_S$ of the workpiece W and the R-axis do not match each other (separate from each other) as illustrated in FIG. 4, the center of the correction circle C1 does not match the R-axis. In this case, the following calculation is performed, and the alignment between the blade 24 and the cutting position is performed.

As illustrated in FIG. 5, at least one alignment mark M1 indicating a reference for the cutting position (cutting reference position) is formed on the surface $W_S$ of the workpiece W. When the center $W_C$ of the cylindrical surface of the workpiece W and the R-axis do not match each other, the control unit 12 first controls the R drive unit 20R to drive the rotary table 28R so that the alignment mark M1 is located at the vertex of the workpiece W. Hereinafter, the rotation position where the alignment mark M1 is located at the vertex of the workpiece W is defined as W4.

Note that, in the example illustrated in FIG. 5, it is assumed that the alignment mark M1 is formed on a symmetrical axis of line symmetry of the workpiece W in order to simplify the subsequent calculation, but the formation position of the alignment mark M1 is not limited to this position.

Further, it is not essential to form the alignment mark M1 on the surface $W_S$ of the workpiece W. For example, the intersection point between the surface $W_S$ of the workpiece W and the symmetrical axis, or a central portion or end portion or the like of a cylindrical portion of the surface $W_S$ of the workpiece W may be automatically set as the cutting reference position, or the cutting reference position may be manually set by the operator.

The calculating unit 16 calculates the Y coordinate of the alignment mark M1, that is, a deviation amount d in the Y direction of the alignment mark M1 with respect to the R-axis from the position of the alignment mark M1 at the vertex of the workpiece W detected by using the imaging device of the sensor unit 26. At this time, an intersection point P4 between a correction circle C0 having a radius Rc centered on the R-axis and a straight line Y=d becomes the position of the center $W_C$ of the workpiece W. In other words, the correction circle C0 matches the locus of the center $W_C$ of the workpiece W when the rotary table 28R is rotated.

Next, the calculating unit 16 calculates, from the equation (1), an angle (hereinafter referred to deviation angle $\theta$) at which a line segment connecting the R-axis (origin (Y, Z)=(0,0)) and the position P4 at the center of the workpiece intersects the Z-axis.

$$\theta = \arcsin(d/Rc) \quad (1)$$

The control unit 12 measures the distance from the displacement sensor to the alignment mark M1 by using the sensor unit 26. The detecting unit 14 calculates the Z coordinate of the alignment mark M1, that is, the height h from the data of the distance from the displacement sensor to the alignment mark M1. Then, the calculating unit 16 calculates the radius r of the workpiece W by the equation (2).

$$r = h - Rc \cdot \cos\theta \quad (2)$$

Next, the calculating unit 16 determines the center coordinate (Y4, Z4) of the workpiece W at the rotation position W4 by the equations (3) and (4).

$$Y4 = d \quad (3)$$

$$Z4 = h - r \quad (4)$$

After detecting the alignment mark M1, the control unit 12 controls the X drive unit 20X and the Y drive unit 20Y to move the blade 24 just above the cutting reference position where the alignment mark M1 is formed. Then, the control unit 12 controls the Z drive unit 20Z and the X drive unit 20X to perform cutting at the cutting reference position. At this time, the incision direction of the blade 24 is perpendicular to the surface $W_S$ of the workpiece W. In other words, the incision direction of the blade 24 is on a plane defined by the central axis of the workpiece W and the cutting reference position of the surface Ws of the workpiece W. As a result, a groove G having a predetermined depth extending toward the center $W_C$ of the cylindrical surface of the workpiece W is formed at the cutting reference position.

Next, a case where grooving is performed at a cutting position which is rotated by an angle δ with respect to the cutting reference position will be described. Furthermore, for convenience of illustration, the angle δ is illustrated to be exaggerated as compared with the actual interval in the grooving in FIG. 6.

First, as illustrated in FIG. 6, the control unit 12 controls the R drive unit 20R to rotate the rotary table 28R by an angle of δ. The rotation position of the workpiece at this time is designated by W5.

The calculating unit 16 calculates the coordinate (Y5, Z5) of a position P5 of the center $W_C$ of the workpiece W at the rotation position W5 by the equations (5) and (6).

$$Y5 = Y4 \cdot \cos\delta - Z4 \cdot \sin\delta \quad (5)$$

$$Z5 = Y4 \cdot \sin\delta - Z4 \cdot \cos\delta \quad (6)$$

At the rotation position W5, the cutting position is a vertex P6 of the workpiece W just above the point P5 of the center $W_C$ of the workpiece W. The calculating unit 16 determines the coordinate (Y6, Z6) of the cutting position P6 by the equations (7) and (8).

$$Y6 = Y5 \quad (7)$$

$$Z6 = Z5 + r \quad (8)$$

The control unit 12 controls the Y drive unit 20Y and the Z drive unit 20Z based on the coordinate (Y6, Z6) of the cutting position P6 to control the alignment between the cutting position P6 and the blade 24 and the cutting depth. As a result, a groove G having a predetermined depth extending toward the center $W_C$ of the cylindrical surface of the workpiece W is formed at the cutting position which is away from the cutting reference position by an angle δ in the circumferential direction.

Subsequently, the workpiece W is rotated by an angle δ, and the position of the center $W_C$ of the workpiece W and the cutting position are calculated to perform alignment for each rotation position of the workpiece W. Further, grooves G are likewise formed in a region on the left side of the drawing with respect to the alignment mark M1. As a result, as illustrated in FIG. 3, grooves G having a predetermined depth extending toward the center $W_C$ of the cylindrical surface of the workpiece W are formed on the surface $W_S$ of the workpiece W at the intervals of the angle S.

According to the present embodiment, when the workpiece W is attached to the rotary table 28R of the workpiece supporting unit 28, it is possible to control the position of the workpiece W so that the cutting position is set to the vertex of the workpiece W without making the central axis of the workpiece W and the workpiece rotation axis (R-axis) match each other. As a result, grooving can be performed perpendicularly to the surface $W_S$ of the workpiece W, so that the grooving can be performed with high accuracy.

Further, according to the present embodiment, since it is not necessary to make the central axis of the workpiece W and the R-axis match each other, the degree of freedom in the position and posture when the workpiece W is fixed to the rotary table 28R is enhanced. Therefore, even in the case of a large-size workpiece or an elongated workpiece, the workpiece W can be attached so as to be fit in a space between the blade 24 and the R-axis by adjusting the attachment position and posture of the workpiece W according to the size and shape of the workpiece W.

Note that the interval 6 between the grooves G is constant in the present embodiment, but even when the interval between the grooves G is not constant, the grooving can be performed in the same procedure as described above.

Further, in the present embodiment, the interval between the grooves G is defined by the angle δ, but it may be determined by the distance in the circumferential direction of the workpiece W. In this case, the grooving can be performed in the same procedure as described above by using the radius r of the workpiece W and converting the distance in the circumferential direction of the workpiece W into the rotation angle of the workpiece W.

[Workpiece Processing Method]

Figure 7:
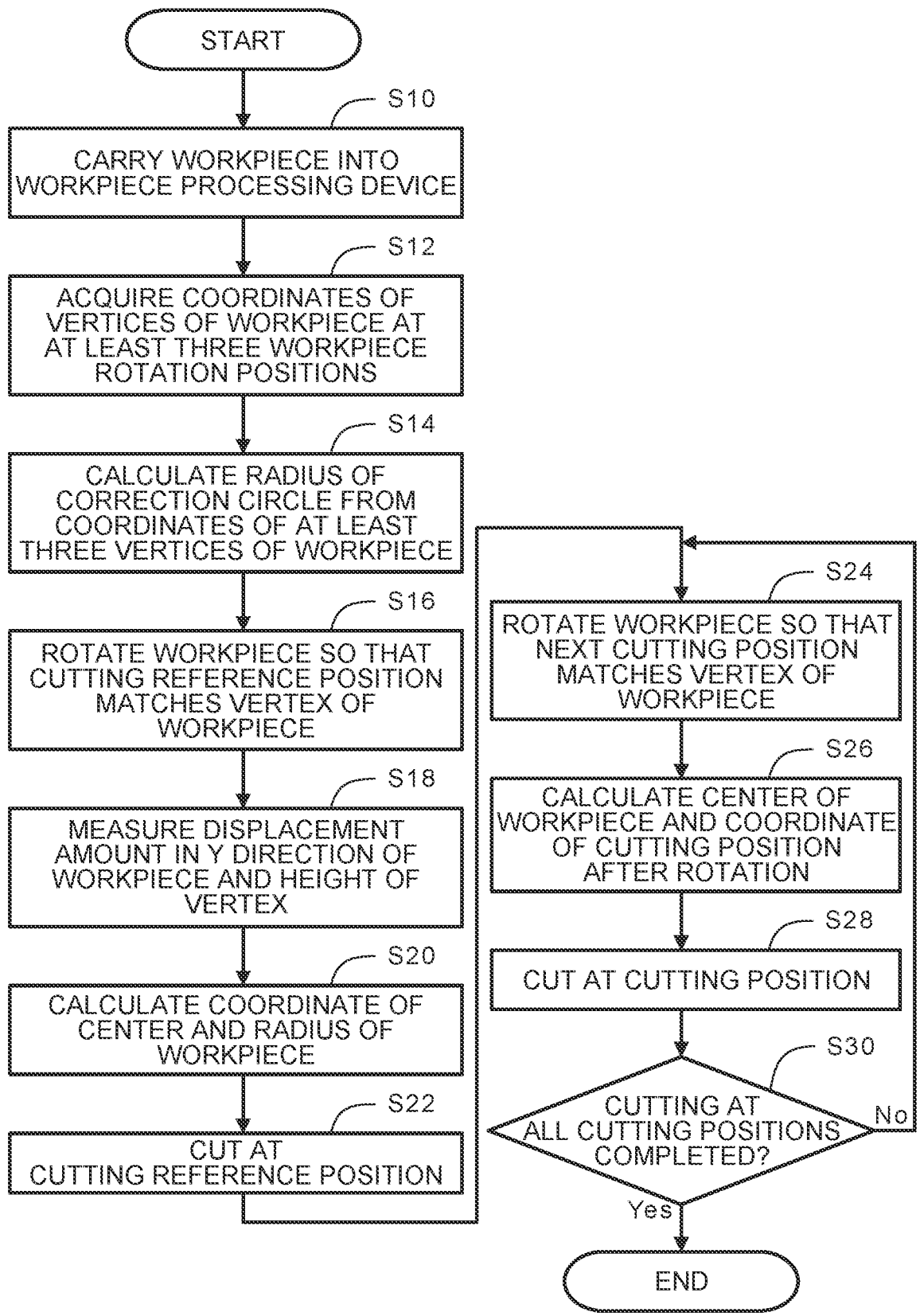
FIG. 7 is a flowchart showing a workpiece processing method according to an embodiment of the presently disclosed subject matter.

Next, a workpiece processing method (grooving method) according to the present embodiment will be described with reference to FIG. 7.

First, a workpiece W having a cylindrical-shape surface $W_S$ is carried into the workpiece processing device 1, and fixed to the rotary table 28R (step S10).

Next, the control unit 12 controls the R drive unit 20R to rotate the workpiece W. and scans the surface $W_S$ of the workpiece W at at least three rotation positions (W1 to W3 in FIG. 4) by using the displacement sensor of the sensor unit 26. The detecting unit 14 calculates the coordinates of vertices of the workpiece W (P1 to P3 in FIG. 4) at at least three rotation positions by using the data of a measurement result obtained by the displacement sensor (step S12).

Next, the calculating unit 16 calculates the radius Rc of the correction circle C1 corresponding to the locus of the vertices of the workpiece W from the coordinates of at least the three vertices of the workpiece W (step S14).

Next, the control unit 12 rotates the workpiece W so that the cutting reference position on which the alignment mark M1 is formed becomes a vertex of the workpiece W (step S16, the rotation position W4 in FIG. 5). Then, the detecting unit 14 detects the vertex (cutting reference position) of the workpiece W at the rotation position W4, and calculates the deviation amount d in the Y-direction and the height h of the vertex of the workpiece W (step S18). Further, the calculating unit 16 calculates the coordinate of the position P4 of the center $W_C$ of the workpiece W at the rotation position W4 and the radius r of the workpiece W (step S20).

Next, the control unit 12 controls the Y drive unit 20Y and the Z drive unit 20Z to perform the alignment between the blade 24 and the cutting reference position of the workpiece W. Then, the control unit 12 controls the X drive unit 20X to perform the cut-feeding in the X direction of the workpiece table 30 while controlling the Z drive unit 20Z to perform the incision-feeding in the Z direction of the blade 24, thereby performing cutting at the cutting reference position by the blade 24 (step S22).

Next, the control unit 12 controls the R drive unit 20R to rotate the workpiece W so that a next cutting position becomes the vertex of the workpiece W (step S24; rotation position W5 in FIG. 6). Then, the calculating unit 16 calculates the coordinates of the position P5 of the center $W_C$ of the workpiece W and the cutting position P6 at the rotation position W5 (step S26).

Next, the control unit 12 controls the Y drive unit 20Y and the Z drive unit 20Z based on the coordinate of the cutting position P6 to perform the alignment between the blade 24 and the cutting reference position of the workpiece W. Then, the control unit 12 controls the X drive unit 20X to perform the cut-feeding in the X direction of the workpiece table 30 while controlling the Z drive unit 20Z to perform the incision-feeding in the Z direction of the blade 24, thereby performing cutting at the cutting reference position by the blade 24 (step S28). At this time, the control unit 12 controls the incision depth of the blade 24 based on the Z coordinate of the cutting position P6.

Next, the control unit 12 repeats the steps S24 to S30 to sequentially form grooves G on the surface $W_S$ of the workpiece W. When the cutting at all the cutting positions has been completed (Yes in step S30), the grooving of the workpiece W is terminated.

Note that in the present embodiment, the height at each position of the surface Ws of the workpiece W is calculated to calculate the coordinates of the vertex in the Z-axis direction of the workpiece W, but the presently disclosed subject matter is not limited to this manner. For example, the coordinate of the vertex may be calculated based on an image obtained by measuring the surface $W_S$ of the workpiece W (for example, contrast, light amount, shading or the like).

Figure 8:
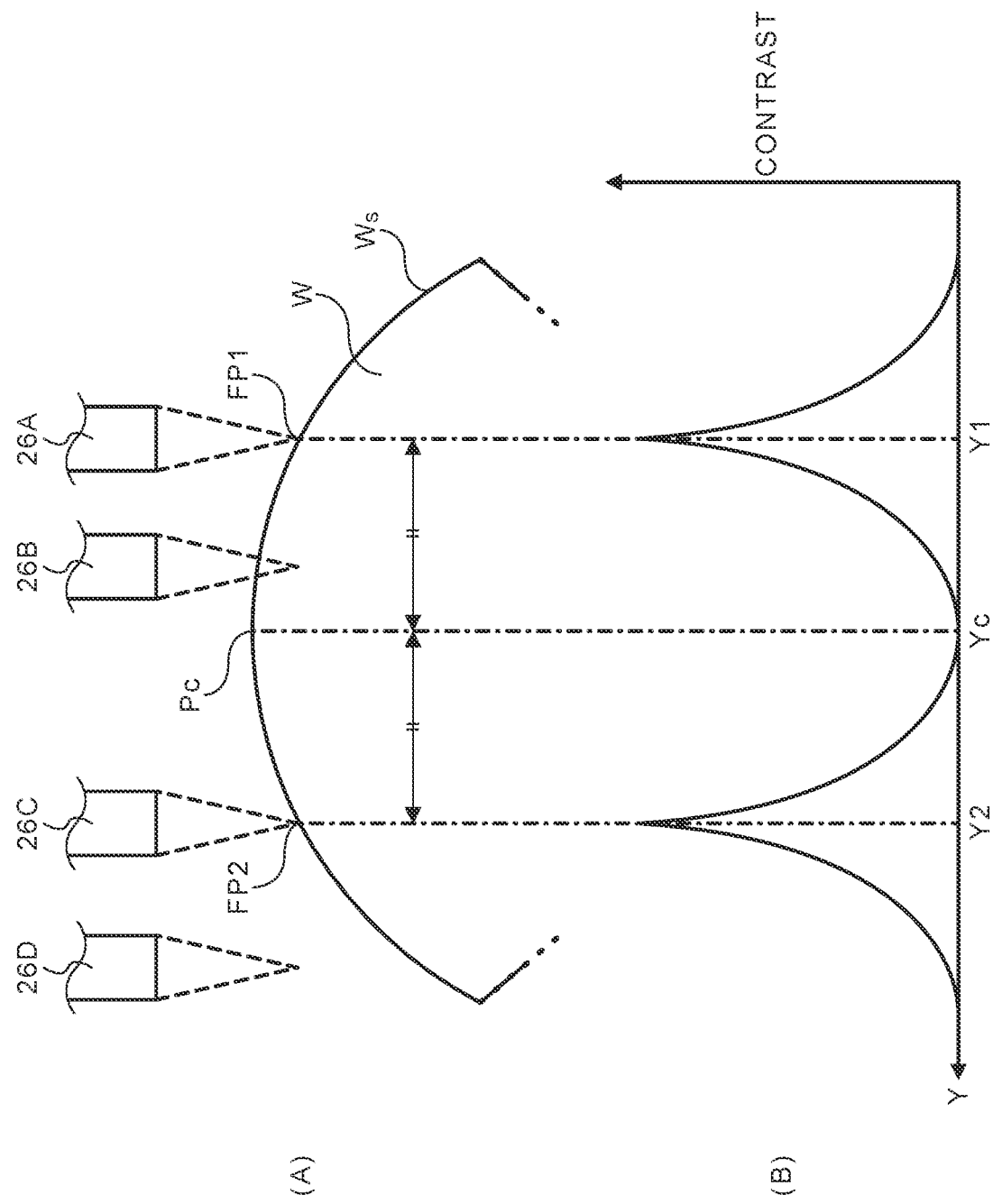
FIG. 8 is a diagram for illustrating a procedure for detecting a vertex of the workpiece.

FIG. 8 is a diagram for illustrating a procedure for detecting the vertex of the workpiece. (A) of FIG. 8 is a diagram showing the positional relationship between the workpiece and the sensor unit, and (B) of FIG. 8 is a graph showing the change in contrast. In the example illustrated in FIG. 8, a case where the shape of the surface $W_S$ of the workpiece W is a cylindrical (perfect circle) shape will be described.

In the example illustrated in FIG. 8, the sensor unit 26 includes a camera having a focus lens and an imaging device (for example, a CCD (Charge Coupled Device)). When a vertex Pc (a point having the largest Z coordinate, that is, a point nearest to the camera) on the surface $W_S$ of the workpiece W is detected, the control unit 12 controls the focus lens of the camera of the sensor unit 26 to fix the focus lens in a state where the focus lens is focused on a point which is farther beyond the vertex Pc of the surface $W_S$ of the workpiece W.

Next, the control unit 12 controls the Y drive unit 20Y to move the camera of the sensor unit 26 in the Y direction (the direction along a third axis) and capture an image. The control unit 12 detects the vertex based on this image. In the example illustrated in (A) of FIG. 8, the camera of the sensor unit 26 is focused on points FP1 and FP2 of the surface $W_S$ of the workpiece W at positions 26A and 26C, and is out of focus at positions 26B and 26D.

As illustrated in (B) of FIG. 8, a contrast value output from the camera of the sensor unit 26 is maximized at the positions Y and Y2 corresponding to the focusing positions FP1 and FP2 of the cameras, respectively. When the surface shape of the workpiece W is a cylindrical (perfect circle) shape, the Y coordinate Yc of the vertex Pc of the workpiece W is Yc (=Y2−Y1/2) because the surface $W_S$ of the workpiece W is approximately line-symmetrical with respect to the Z axis. With respect to the Z coordinate Zc of the vertex Pc, it may be measured by the focus function of the camera of the sensor unit 26, or may be measured by using a displacement sensor. If the shape of the surface $W_S$ of the workpiece W is known in advance, it may be calculated from the surface shape.

Here, it is preferable in the vertex detection method illustrated in FIG. 8 that the depth of field is shallowed (for example, the focal length of the camera lens of the sensor unit 26 is increased or the aperture value (F value) of the camera lens of the sensor unit 26 is decreased). As a result, the range in which the camera of the sensor unit 26 is in focus can be narrowed, so that the focusing positions FP1 and FP2 can be detected with high accuracy.

In FIG. 8, the workpiece W whose surface $W_S$ has the cylindrical (perfect circle) shape has been described. However, even when the workpiece W has a non-cylindrical shape deviated from the cylindrical shape, it would be possible to detect the position of the vertex Pc by the vertex detection method illustrated in FIG. 8 if the surface $W_S$ is substantially line-symmetric with respect to the Z axis.

Further, even when the surface $W_S$ is not substantially line-symmetrical with respect to the Z axis, it is possible to perform vertex detection by using the vertex detection method illustrated in FIG. 8 and the detection using the displacement sensor in combination. For example, a position in the vicinity of a median line of the focusing positions FP1 and FP2 is specified as an approximate position of the vertex Pc by the vertex detection method illustrated in FIG. 8, and an accurate position of the vertex Pc is detected by using the displacement sensor, whereby the vertex detection can be efficiently performed.

Further, the position of the vertex may be calculated based on a physical quantity other than the contrast value, for example, a change in light amount, shading or the like.

[When the Surface Shape of the Workpiece is not a Cylindrical (Perfect Circle) Shape]

In the above-described embodiment, the case where the shape of the surface $W_S$ of the workpiece W is a cylindrical (perfect circle) shape has been described, but there is a case where the shape of the surface $W_S$ of the workpiece W is deviated from the cylindrical (perfect circle) shape depending on the accuracy in the bending processing of the workpiece W (for example, the layer of the piezoelectric element).

Figure 9:
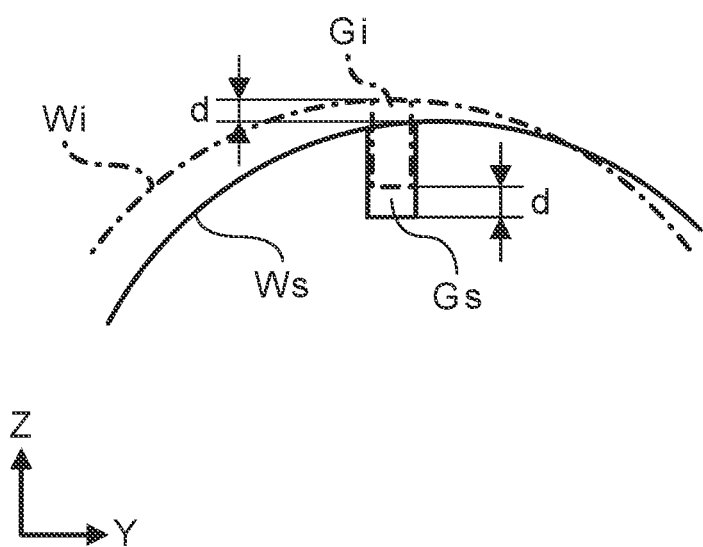
FIG. 9 is a diagram showing an example in which the surface shape of the workpiece is not a cylindrical shape.

FIG. 9 is a diagram showing an example in which the surface shape of the workpiece is not a cylindrical shape. In FIG. 9, reference character Wi designates the surface of the workpiece W in the case of an ideal cylindrical (perfect circle) shape. Here, for convenience of illustration, the displacement of the workpiece W and the shape of the groove are illustrated to be exaggerated.

In the example illustrated in FIG. 9, the surface $W_S$ of the workpiece W is displaced to the −Z side with respect to the surface Wi having the ideal cylindrical shape at the cutting position. Therefore, if grooving is performed on the assumption of the cylindrical-shape surface Wi, the incision depth of the blade 24 shallows as designated by reference character Gi. When the workpiece W is a layer of a piezoelectric element having a drive electrode, it would be impossible to divide the drive electrode if the incision depth of the blade 24 is insufficient.

Therefore, the actual height position in the Z direction of the cutting position is measured by the sensor unit 26, and further the difference d of the actual height position from that in the case of an ideal cylindrical shape is measured by the calculating unit 16. When grooving of a groove Gs is performed, the control unit 12 performs cut-feeding so that the blade 24 is located more deeply in the −Z direction by the difference d.

On the contrary, when the surface $W_S$ of the workpiece W is displaced to the +Z side at the cutting position, the cut-feeding is performed so that the blade 24 is located more shallowly in the +Z direction. In other words, in the above embodiment, it is possible to surely cut the workpiece W by adjusting the depth of the cut-feeding of the blade 24 based on a measurement result of the actual height position in the Z direction of the cutting position.

[Specific Example of Grooving for an Outwardly-Convex Curved-Surface-Shape Workpiece]

Next, a procedure of grooving for an outwardly-convex curved-surface-shape workpiece will be described with reference to FIGS. 10 to 17. FIGS. 10 to 17 are diagrams for illustrating the procedure of grooving for the outwardly-convex curved-surface-shape workpiece. Here, FIG. 13 is a partially enlarged view of FIG. 12 (an enlarged view of a portion of XIII).

In the following description, a case where grooves G are formed at equal intervals in the circumferential direction on the surface $W_S$ of the workpiece W will be described. Further, FIGS. 10 to 17 show the workpiece W which is simplified as a fan shape connecting the surface $W_S$ and the center thereof. Further, the position of the workpiece rotation axis (R-axis) is assumed to be set to the origin (Y, Z)=(0, 0).

(Procedure 1: Calculate the Surface Shape of the Workpiece)

First, the workpiece W is attached to the rotary table 28R, and the shape of the surface $W_S$ of the workpiece W is calculated. In the present embodiment, a surface shape function Z=f(Y) indicating the shape of the surface $W_S$ of the workpiece W on the YZ plane is calculated. Note that in the present embodiment, when the workpiece W is attached to the rotary table 28R, the central axis of the workpiece W and the workpiece rotation axis (R-axis) only need to be parallel to each other, and are not required to match each other.

Figure 10:
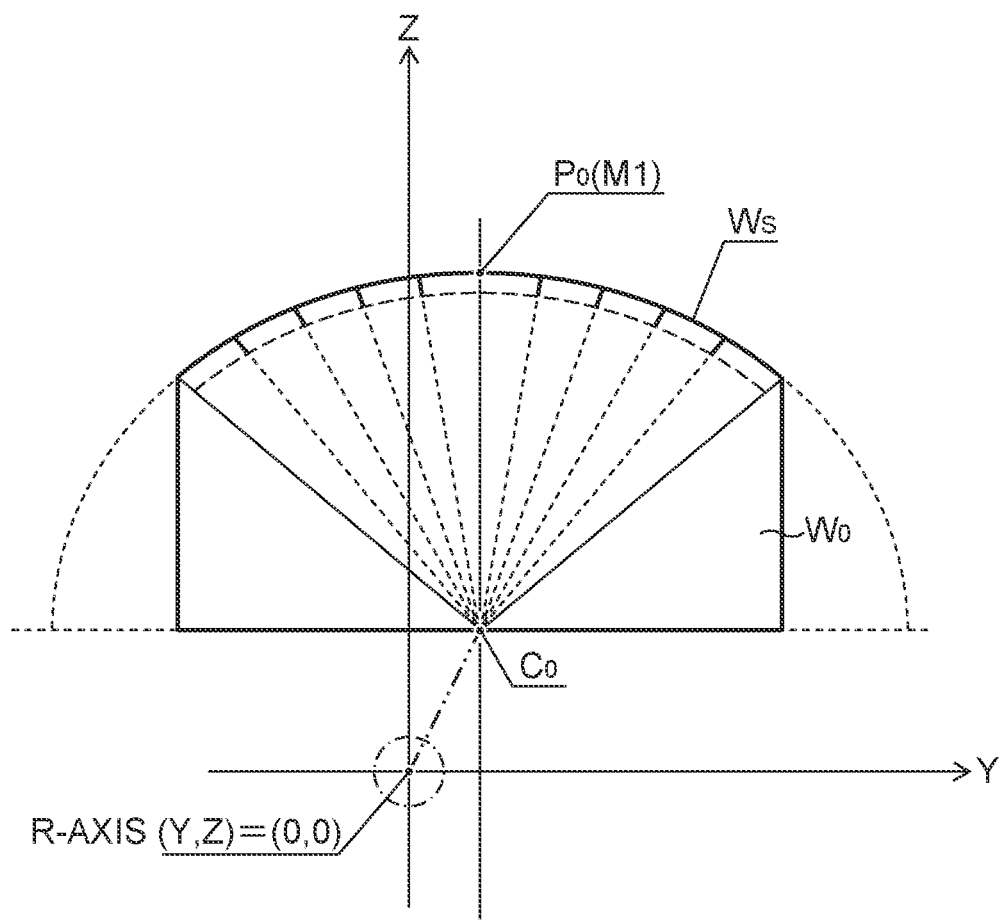
FIG. 10 is a diagram for illustrating a procedure of grooving for an outwardly-convex curved-surface-shape workpiece.

As illustrated in FIG. 10, at least one alignment mark M1 indicating a reference of the cutting position (cutting reference position) $P_0$ is formed on the surface $W_S$ of the workpiece W. In the following description, a position where the cutting reference position $P_0$ matches the vertex of the surface $W_S$ of the workpiece W (the point where the Z coordinate is maximum) is defined as a reference rotation position $W_0$, and positions of the workpiece W when the workpiece W is counterclockwise rotated by an angle φ (10° in one example), 2φ, 3φ, and 4φ with respect to the reference rotation position $W_0$ are defined as rotation positions $W_1$, $W_2$, $W_3$, and $W_4$, respectively. The vertices of the surface $W_S$ of the workpiece W at the rotation positions $W_1$, $W_2$, $W_3$ and $W_4$ are designated by $Pc_1$, $Pc_2$, $Pc_3$ and $Pc_4$, respectively.

Here, in the example illustrated in FIG. 10 and the like, the surface $W_S$ of the workpiece W is illustrated as an ellipse, and reference characters $C_0$ to $C_4$ in the figures designate the positions of the center of the surface $W_S$ at the rotation positions $W_0$ to $W_4$, respectively.

Figure 11:
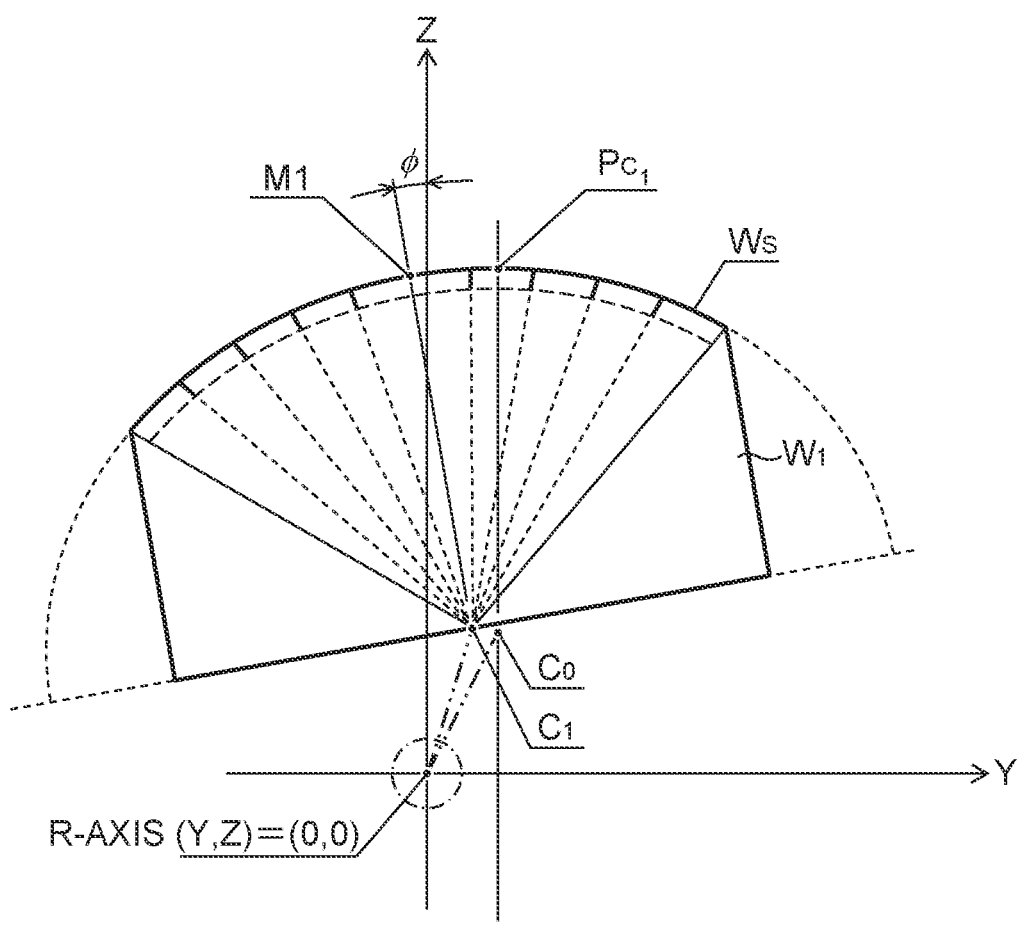
FIG. 11 is a diagram for illustrating the procedure of grooving for the outwardly-convex curved-surface-shape workpiece.
Figure 12:
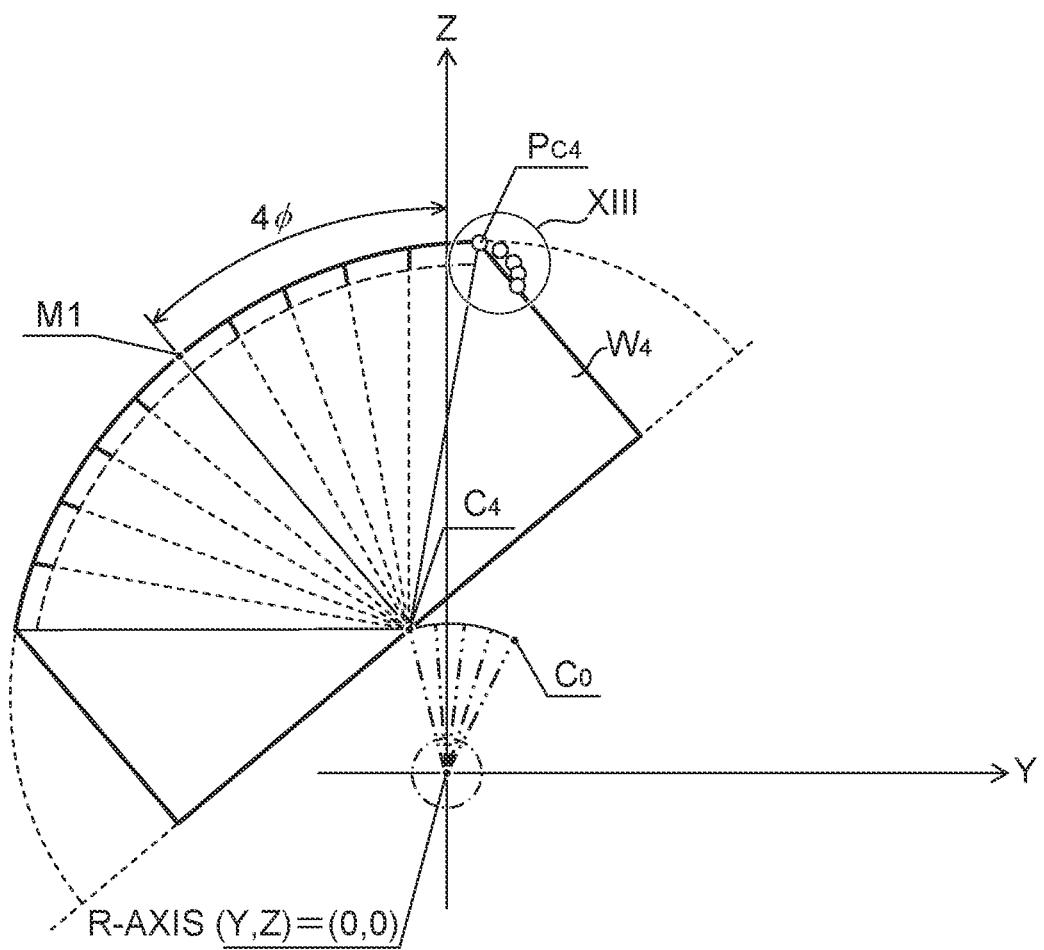
FIG. 12 is a diagram for illustrating the procedure of grooving for the outwardly-convex curved-surface-shape workpiece.
Figure 13:
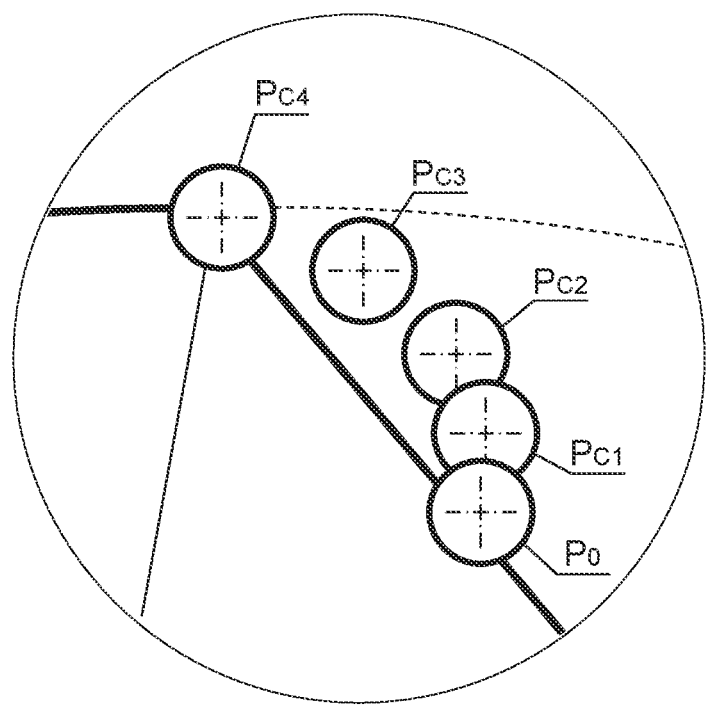
FIG. 13 is a diagram for illustrating the procedure of grooving for the outwardly-convex curved-surface-shape workpiece.

When the surface shape function Z=f(Y) of the workpiece W is calculated, as illustrated in FIGS. 10 to 12, the control unit 12 counterclockwise rotates the workpiece W around the R-axis by each angle φ.

The detecting unit 14 scans the surface $W_S$ of the workpiece W and determines the vertices $Pc_1$, $Pc_2$, $Pc_3$ and $Pc_4$ of the workpiece W at the respective rotation positions $W_0$, W, $W_2$, $W_3$ and $W_4$. As a result, as illustrated in FIG. 13, the coordinate ($Y_0$, $Z_0$) of the vertex (reference cutting position) $P_0$ at the reference rotation position $W_0$, and the coordinates ($Yc_1$, $Zc_1$), ($Yc_2$, $Zc_2$), ($Yc_3$, $Zc_3$), and ($Yc_4$, $Zc_4$) of the vertices $Pc_1$, $Pc_2$, $Pc_3$ and $Pc_4$ of the workpiece W at the rotation positions $W_1$, $W_2$, $W_3$ and $W_4$ to which the workpiece W is counterclockwise rotated by an angle φ, 2φ, 3φ, and 4φ with respect to the reference rotation position $W_0$ are calculated.

Figure 14:
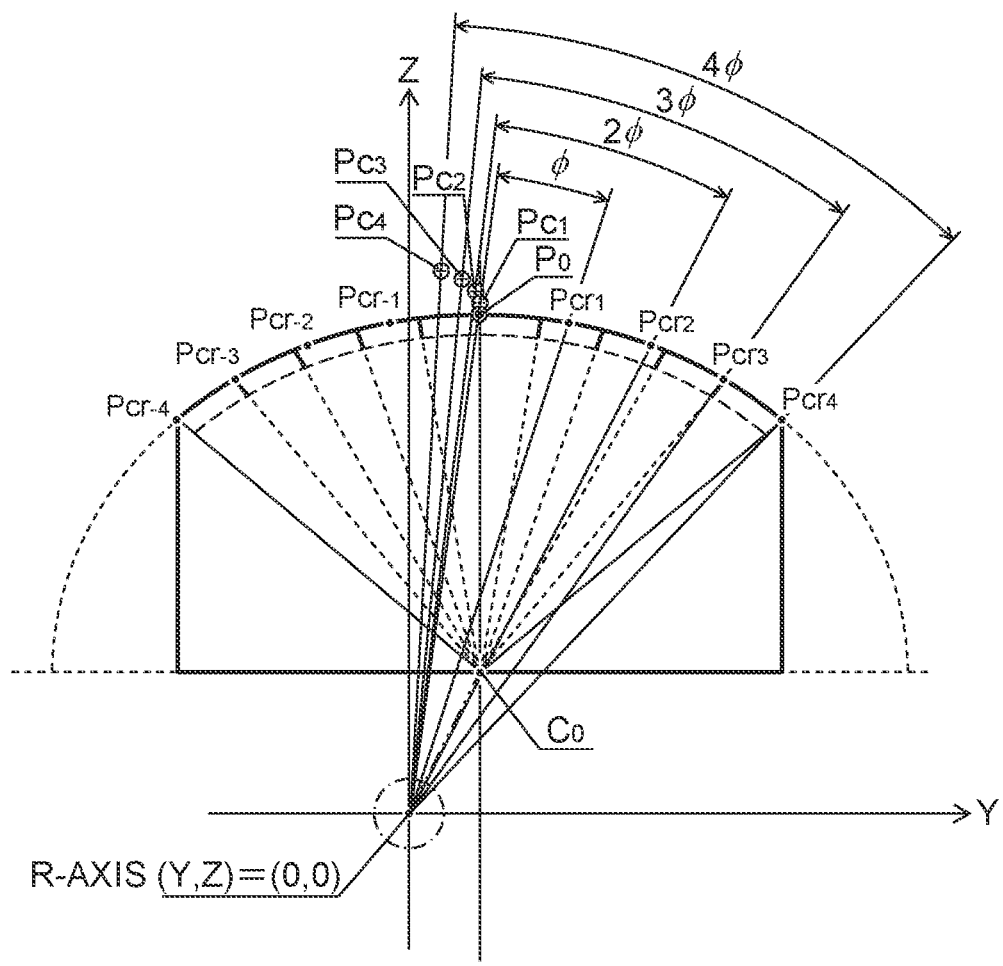
FIG. 14 is a diagram for illustrating the procedure of grooving for the outwardly-convex curved-surface-shape workpiece.

The calculating unit 16 calculates the coordinates ($Ycr_1$, $Zcr_1$), ($Ycr_2$, $Zcr_2$), ($Ycr_3$, $Zcr_3$), and ($Ycr_4$, $Zcr_4$) of points $Pcr_1$, $Pcr_2$, $Pcr_3$ and $Pcr_4$ to which the vertexes $Pc_1$, $Pc_2$, $Pc_3$ and $Pc_4$ of the workpiece W at the rotation positions $W_0$, $W_1$, $W_2$, $W_3$ and $W_4$ are clockwise rotated around the R-axis by an angle φ, 2φ, 3φ, and 4φ, respectively. As illustrated in FIG. 14, when the workpiece W is located at the reference rotation position $W_0$, the points $Pcr_1$, $Pcr_2$, $Pcr_3$ and $Pcr_4$ are located on the surface $W_S$ of the workpiece W.

Likewise, the control unit 12 detects a vertex by using the detecting unit 14 at each of rotation positions to which the workpiece W is rotated clockwise by an angle q. 2p, 3q, and 4φ respectively with respect to the reference rotation position $W_0$. Further, the calculating unit 16 calculates the coordinates of points $Pcr_{-1}$, $Pcr_{-2}$, $Pcr_{-3}$, and $Pcr_{-4}$ to which these vertices are rotated counterclockwise by each angle q. As a result, the coordinates of the points $Pcr_{-4}$, $Pcr_{-3}$, $Pcr_{-2}$, $Pcr_{-1}$, $P_0$, $Pcr_1$, $Pcr_2$, $Pcr_3$ and $Pcr_4$ on the surface $W_S$ of the workpiece W at the reference rotation position $W_0$ are calculated.

The calculating unit 16 calculates the surface shape function Z=f(Y) of the workpiece W by using the coordinates of the points $Pcr_{-4}$, $Pcr_{-3}$, $Pcr_{-2}$, $Pcr_{-1}$, $P_0$, $Pcr_1$, $Pcr_2$, $Pcr_3$ and $Pcr_4$ on the surface $W_S$ of the workpiece W. Here, the surface shape function Z=f(Y) can be determined, for example, by using the coordinates of the points $Pcr_{-4}$, $Pcr_{-3}$, $Pcr_{-2}$, $Pcr_{-1}$, $P_0$, $Pcr_1$, $Pcr_2$, $Pcr_3$ and $Pcr_4$ on the surface $W_S$ of the workpiece W, for example, according to polynomial interpolation, segmented polynomial interpolation, Lagrange interpolation, spline interpolation, Newton interpolation or the like. Note that the calculation method of the surface shape function Z=f(Y) is not limited to this method, and for example, the least squares approximation may be applied.

In the example illustrated in FIGS. 10 to 14, the number of rotation positions at which vertices are detected for calculating the surface shape function Z=f(Y) is set to 9, but the presently disclosed subject matter is not limited to this number. The number of rotation positions can be increased or decreased according to the required accuracy and the like. Further, the angles for measuring a plurality of rotation positions are not required to be equal to one another. For example, the number of vertices may be increased for portions (for example, portions in the vicinity of both end portions in the Y direction) whose shapes are considered to be greatly deviated from the cylindrical shape.

Note that, in the present embodiment, the surface shape function Z=f(Y) is calculated based on the detection result of the coordinates of the vertices at a plurality of rotation positions, but the presently disclosed subject matter is not limited to this manner. For example, a displacement sensor capable of scanning the entire surface $W_S$ of the workpiece W in the Y direction may be used as the sensor unit 26 to measure the shape of the surface $W_S$ of the workpiece W and calculate the surface shape function $Z=f(Y)$ based on the measurement result without detecting a vertex at each rotation position of the workpiece W.

(Procedure 2: Calculation of Cutting Position)

Next, the cutting position on the surface $W_S$ of the workpiece W is calculated based on the surface shape function $Z=f(Y)$ of the workpiece W.

Figure 15:
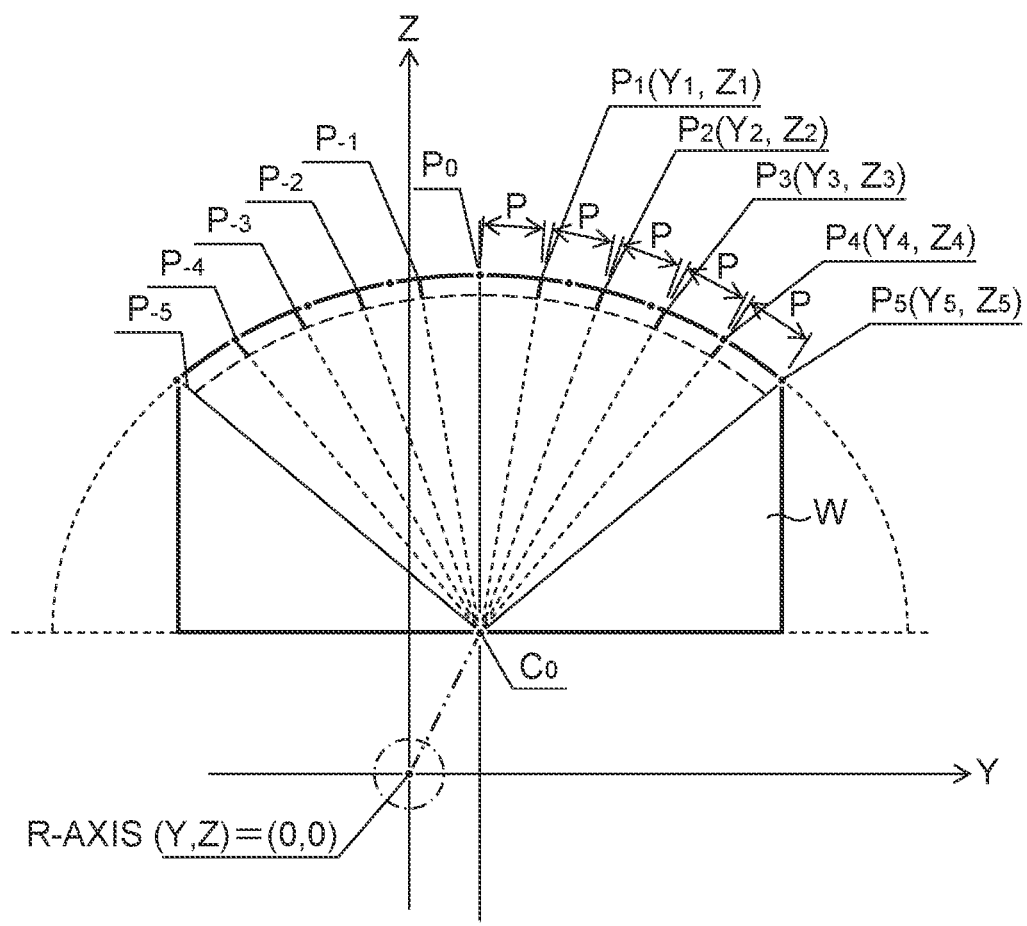
FIG. 15 is a diagram for illustrating the procedure of grooving for the outwardly-convex curved-surface-shape workpiece.

In the present embodiment, an example in which every five grooves on each of the right and left sides of the reference cutting position $P_0$, that is, a total of eleven grooves G are formed at equal intervals (pitch P) as illustrated in FIG. 15 will be described. Note that the number of grooves G is not limited to this number. In the following description, the cutting position on the right side of FIG. 15 with respect to the reference cutting position $P_0$ is defined as $P_1$ to $P_5$ in order from the $P_0$ side, and the cutting position on the left side of FIG. 15 with respect to the reference cutting position $P_0$ is defined as $P_{-1}$ to $P_{-5}$ in order from the $P_0$ side. Here, the cutting position $P_n$ is a position which is displaced from the reference cutting position $P_0$ to the right side (+Y side) by only a distance nP in FIG. 15 on the surface shape function $Z=f(Y)$, and the cutting position $P_{-n}$ is a position which is displaced from the reference cutting position $P_0$ to the left side (−Y side) in FIG. 15 by only a distance nP on the surface shape function $Z=f(Y)$ (n=1, . . . , 5).

The calculating unit 16 calculates the coordinates of the cutting positions $P_1$ to $P_5$ and $P_{-1}$ to $P_{-5}$ when the workpiece W is located at the reference rotation position $W_0$. The distance P from the cutting position $P_{n-1}$ to $P_n$ on the surface shape function $Z=f(Y)$ is expressed by the following equation (9). Here, f′(Y) is a function obtained by performing first derivation (partial differentiation) on the surface shape function $Z=f(Y)$ with respect to Y.

[Expression 1]

$$P = \int_{P_{n-1}}^{P_n} \sqrt{1+[f'(Y)]^2} \, dY \quad (9)$$

$Y_1$ is calculated by substituting the Y coordinate $Y_0$ of the cutting reference position $P_0$ and the pitch P into the equation (9) with n=1 and solving the equation (9) for the Y coordinate $Y_1$ of the cutting position $P_1$. The Z coordinate $Z_1$ of the cutting position $P_1$ is calculated by substituting $Y_1$ into the surface shape function $Z=f(Y)$.

Subsequently, the Y coordinate $Y_n$ of the cutting position $P_n$ is calculated by substituting the Y coordinate $Y_{n-1}$ of the cutting position $P_{n-1}$ into the equation (9) and solving the equation (9), and the Z coordinate $Z_n$ of the cutting position $P_n$ is calculated by substituting $Y_n$ into the surface shape function $Z=f(Y)$. By repeating the above calculation, the coordinates of the cutting positions $P_1$ to $P_5$ and $P_{-1}$ to $P_{-5}$ when the workpiece W is located at the reference rotation position $W_0$ are calculated.

When the interval (pitch P) of the grooves G is short, in other words, when the surface shape function $Z=f(Y)$ between the cutting positions $P_{n-1}$ and $P_n$ can be regarded as a straight line, it is possible to determine the coordinate of the cutting position $P_n$ by using the following equation (10) and the surface shape function $Z=f(Y)$.

[Expression 2]

$$P = \sqrt{(Y_n - Y_{n-1})^2 + (Z_n - Z_{n-1})^2} \quad (10)$$

Note that in the equation (9), the coordinate of the cutting position $P_n$ is calculated from the coordinate of the cutting position $P_{n-1}$ adjacent thereto, but the presently disclosed subject matter is not limited to this manner. For example, the coordinate of the cutting position $P_n$ may be calculated from the coordinate of the reference cutting position $P_0$ by using the following equation (11).

[Expression 3]

$$nP = \int_{P_0}^{P_n} \sqrt{1+[f'(Y)]^2} \, dY \quad (11)$$

In addition, in the present embodiment, the coordinate of the cutting position $P_n$ is calculated based on the surface shape function $Z=f(Y)$ and the interval (pitch P) of the grooves G, but the presently disclosed subject matter is not limited to this manner. For example, when an alignment mark indicating the cutting position $P_n$ is formed in advance on the surface of the workpiece W, the procedure 2 can be omitted.

(Procedure 3: Calculation of the Rotation Angle of the Workpiece During Cutting)

As described above, in order to secure the processing accuracy (division accuracy) of the workpiece W, the incision direction of the blade 24 is required to be perpendicular to the surface $W_S$ of the workpiece W. Therefore, when cutting is performed at the cutting position $P_n$, the calculating unit 16 calculates the rotation angle $\delta_n$ (the rotation angle from the reference rotation position $W_0$) of the workpiece W at which the cutting position $P_n$ matches the vertex of the workpiece W. When cutting is performed at the cutting position $P_n$, the control unit 12 rotates the workpiece W so that the cutting position $P_n$ matches the vertex of the workpiece W.

Figure 16:
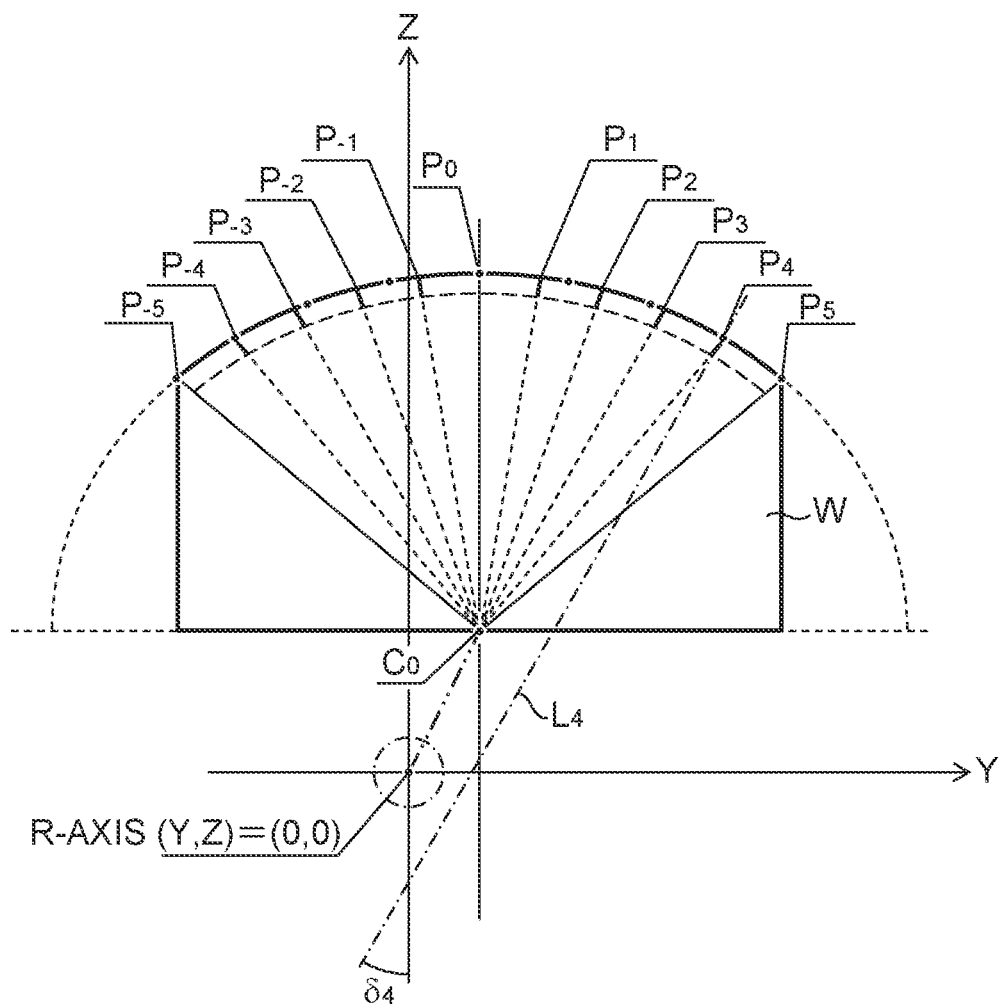
FIG. 16 is a diagram for illustrating the procedure of grooving for the outwardly-convex curved-surface-shape workpiece.
Figure 17:
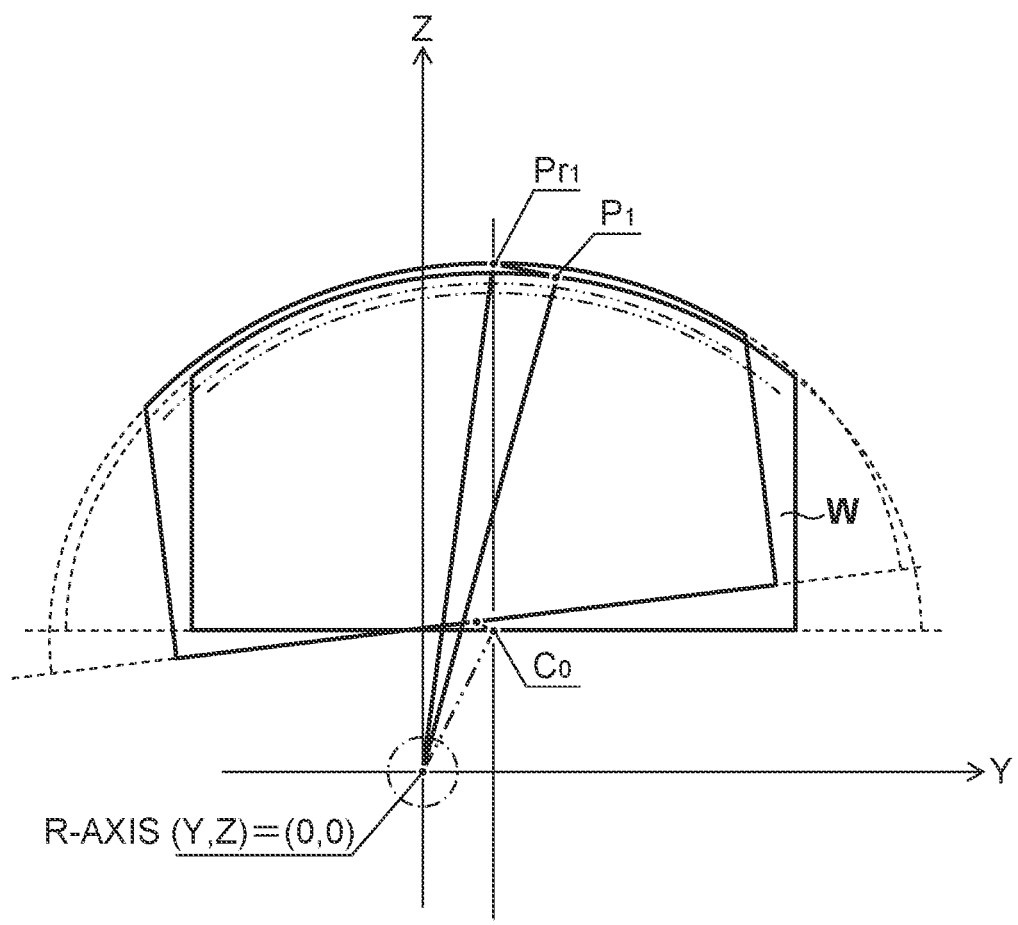
FIG. 17 is a diagram for illustrating the procedure of grooving for the outwardly-convex curved-surface-shape workpiece.

By designating the normal line at the cutting position $P_n$ by $L_n$ when the workpiece W is located at the reference rotation position $W_0$, the gradient of the normal line $L_n$ is equal to $-1/f'(Y_n)$. As illustrated in FIG. 16, when the intersection angle between the normal line $L_n$ and the Z-axis is designated by $\delta_n$, the following equation (12) is obtained. Here, for the sake of simplicity, only a normal line $L_4$ and an angle $\delta_4$ are illustrated in FIG. 16.

[Expression 4]

$$\tan(90° - \delta_n) = -\frac{1}{f'(Y_n)} \quad (12)$$

As illustrated in FIG. 14, in order to match the cutting position $P_n$ with the vertex of the surface $W_S$ of the workpiece W, the workpiece W may be counterclockwise rotated from the reference rotation position $W_0$ by $\delta_n$ that the normal line $L_n$ is parallel to the Z-axis. By solving the above equation (12), it is possible to calculate the rotation angle $\delta_n$ from the reference rotation position $W_0$ to match the cutting position $P_n$ with the vertex of the surface $W_S$ of the workpiece W.

Here, when the workpiece W is line-symmetrical with respect to the Z-axis at the reference rotation position $W_0$, $|\delta_n| = |\delta_{-n}|$.

Further, in the present embodiment, the gradient of the normal line $L_n$ of the surface shape function $Z=f(Y)$ at the cutting position $P_n$ is calculated to make the normal line $L_n$ parallel to the Z-axis. However, the gradient of the tangent line of the surface shape function $Z=f(Y)$ at the cutting position $P_n$ may be calculated so that the tangent line is perpendicular to the Z-axis.

(Procedure 4. Calculation of the Coordinate of the Cutting Position During Cutting)

Next, the coordinate of the cutting position $P_n$ when the cutting position $P_n$ is located at the vertex of the surface $W_S$ of the workpiece W is calculated. The coordinate of the cutting position $P_n$ when the workpiece W is located at the reference rotation position $W_0$ (before rotation) is designated by $(Y_n, Z_n)$, and the coordinate of a cutting position $Pr_n$ when the workpiece W is counterclockwise rotated from the reference rotation position $W_0$ by a rotation angle $\delta n$ (after rotation) is designated by $(Yr_n, Zr_n)$. At this time, the coordinate $(Yr_n, Zr_n)$ of the cutting position $Pr_n$ after rotation is calculated by the following equations (13) and (14).

$$Yr_n = Y_n \cdot \cos \delta_n - Z_n \cdot \sin \delta_n \quad (13)$$

$$Zr_n = Y_n \cdot \sin \delta_n + Z_n \cdot \cos \delta_n \quad (14)$$

Note that in the present embodiment, the rotation angle $\delta_n$ of the workpiece W is calculated based on the reference rotation position $W_0$, but it may be calculated based on another cutting position $P_n$ (for example, the cutting position $P_5$ or $P_{-5}$ on the most $\pm Y$ side).

(Grooving)

Next, the control unit 12 controls the X drive unit 20X, the Y drive unit 20Y, the Z drive unit 20Z, and the R drive unit 20R to perform grooving. In the following description, for the sake of simplicity, it is assumed that the rotation position of the workpiece W at the start time of grooving is the reference rotation position $W_0$, and the grooving is performed in the order of $P_0$, $P_1$, $P_2$, etc. Note that the order of grooving is not limited to this order. For example, $P_{-5}$ is set to the vertex at the start time of grooving, and then the grooving may be performed in the order of $P_{-5}$, $P_{-4}$, ..., $P_4$, and $P_5$.

First, the control unit 12 performs grooving for the reference cutting position $P_0$ of the workpiece W % bile the workpiece W is located at the reference rotation position $W_0$. Here, the control unit 12 controls the Y drive unit 20Y and the Z drive unit 20Z to perform alignment between the blade 24 and the reference cutting position $P_0$ $(Y_0, Z_0)$ of the workpiece W. Then, the control unit 12 control the X drive unit 20X to perform cut-feeding in the X direction of the workpiece table 30 while controlling the Z drive unit 20Z to perform incision-feeding in the Z direction of the blade 24, thereby performing cutting for the reference cutting position $P_0$ by the blade 24. At this time, the control unit 12 controls the Z drive unit 20Z based on the Z coordinate $Z_0$ of the reference cutting position $P_0$ to control the incision depth of the blade 24.

Next, when the grooving for the reference cutting position $P_0$ is completed, grooving for the cutting position $P_1$ ($Pr_1$) is performed. The control unit 12 controls the Z drive unit 20Z to retract the blade 24 in the +Z direction. Thereafter, the control unit 12 controls the R drive unit 20R to counter-clockwise rotate the workpiece W from the reference rotation position $W_0$ by only a rotation angle $Si$ so that the cutting position $P_1$ $(Y_1, Z_1)$ calculated in the procedures 1 and 2 is displaced to the vertex $Pr_1(Yr_1, Zr_1)$ of the workpiece W. As a result, the normal line Li of the surface shape function $Z=f(Y)$ at the cutting position $Pr_1$ $(Yr_1, Z_n)$ of the vertex of the workpiece W is parallel to the Z-axis. The control unit 12 performs grooving for the cutting position $Pr_1$ $(Yr_1, Zr_1)$ as in the case of the reference cutting position $P_0$.

Next, when the grooving at the cutting position $Pr_1$ is completed, grooving is performed for the cutting position $P_2$ ($P_r$). The control unit 12 retracts the blade 24, further counterclockwise rotates the workpiece W by only a rotation angle $(\delta_2 - \delta_1)$, and then performs grooving for the cutting position $Pr_2$ $(Yr_2, Zr_2)$ in the same manner as described above.

The above procedure is subsequently repeated, whereby the grooving for the cutting positions $P_1$ to $P_5$ and $P_{-1}$ to $P_{-5}$ ($Pr_1$ to $Pr_5$ and $Pr_{-1}$ to $Pr_{-5}$) is completed.

According to the present embodiment, even when the surface $W_S$ of the workpiece W has a non-cylindrical shape, the incision direction of the blade 24 can be set to be perpendicular to the surface $W_S$ of the workpiece W by calculating the surface shape function $Z=f(Y)$. As a result, it is possible to adjust the incision position of the blade 24 with high accuracy.

According to the present embodiment, since it is not necessary to make the central axis of the workpiece W and the R-axis match each other, the degree of freedom in the position and posture when fixing the workpiece W to the rotary table 28R is increased. Therefore, even in the case of a large-size workpiece or an elongated workpiece, by adjusting the attachment position and posture of the workpiece W according to the size and shape of the workpiece W, it is possible to attach the workpiece W so that the workpiece W can be fit in a space between the blade 24 and the R-axis.

Note that, in the present embodiment, the case where the intervals of the grooves G on the surface $W_S$ of the workpiece W are equal to one another has been described, but the presently disclosed subject matter is not limited to this manner. For example, even when the intervals of the grooves G are unequal to one another, the cutting position can be calculated by using the function of the surface $W_S$ of the workpiece W. Therefore, the workpiece processing method according to the above-mentioned embodiment can be applied to even a case where the intervals of the grooves G are unequal to one another.

[Workpiece Processing Method for Non-Cylindrical-Shape Workpiece]

Figure 18:
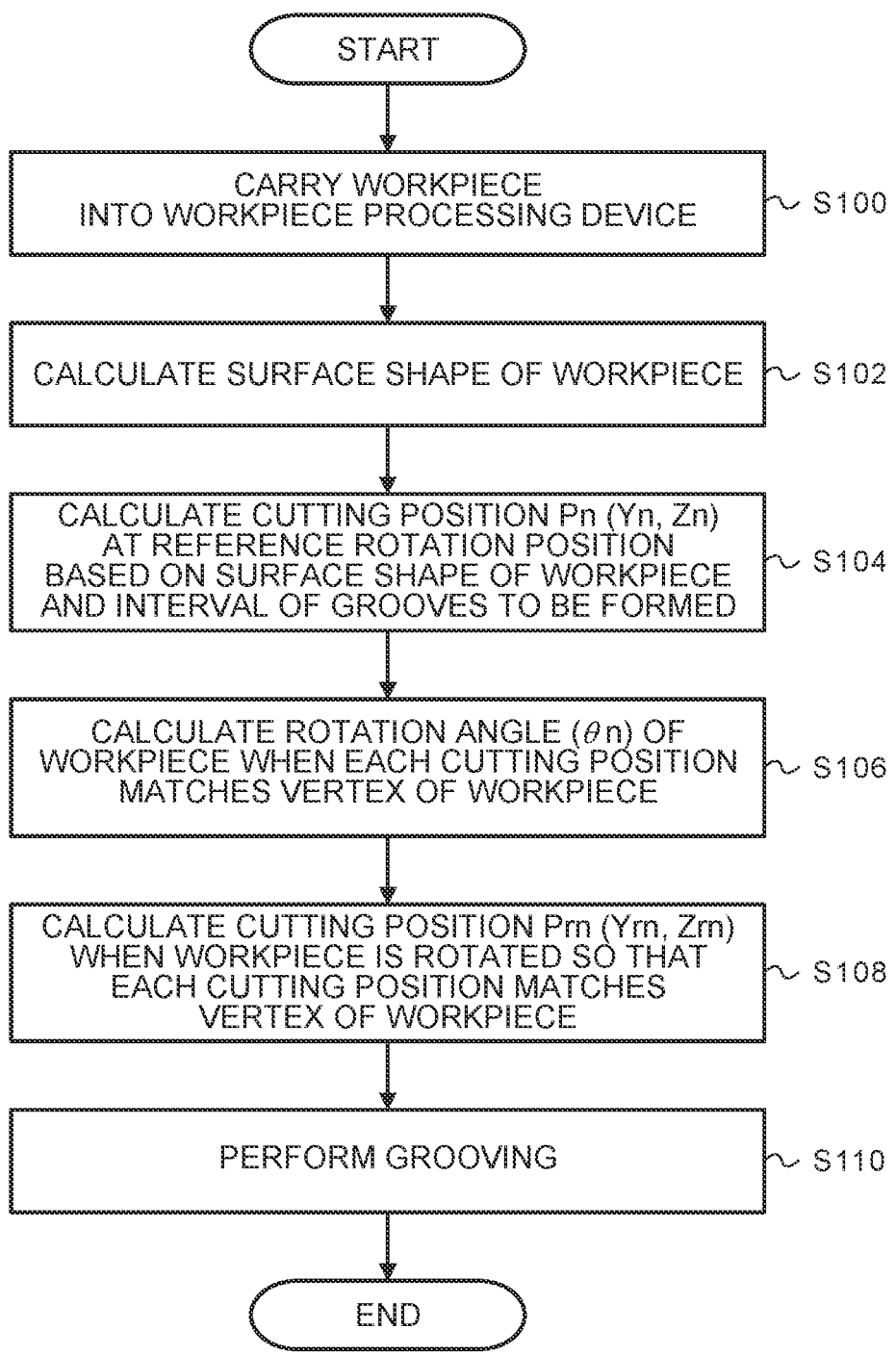
FIG. 18 is a flowchart showing a workpiece processing method according to an embodiment of the presently disclosed subject matter.

Next, a workpiece processing method (grooving method) for a non-cylindrical-shape workpiece will be described with reference to FIG. 18.

First, the workpiece W is carried into the workpiece processing device 1, and fixed to the rotary table 28R (step S10).

Next, the control unit 12 calculates the surface shape function $Z=f(Y)$ representing the shape of the surface $W_S$ of the workpiece W (step S102). In step S102, the control unit 12 controls the R drive unit 20R to rotate the workpiece W, and measures the surface $W_S$ of the workpiece W by using a camera (see FIG. 8) of the sensor unit 26 at a plurality of rotation positions (see $W_0$ to $W_4$ in FIGS. 10 to 14). The detecting unit 14 uses data of a measurement result by the sensor unit 26 to calculate the coordinates of the vertices (see $P_0$ of FIG. 13, $Pcr_1$ to $Pcr_4$ and $Pcr_{-1}$ to $Pcr_{-4}$) of the workpiece W from the rotation position $W_0$ to the rotation position $W_4$. The calculating unit 16 calculates the surface shape function $Z=f(Y)$ based on the vertices of the workpiece W at the respective rotation positions (see FIGS. 10 to 14). Here, in step S102, the surface shape function $Z=f(Y)$ may be directly determined by using a sensor capable of measuring the Z coordinate of the surface $W_S$ of the workpiece W.

Next, the calculating unit 16 calculates the coordinate $(Y_n, Z_n)$ of the cutting position $P_n$ on the surface $W_S$ of the workpiece W based on the surface shape function $Z=f(Y)$ of the workpiece W and the interval of the grooves G formed on the surface $W_S$ of the workpiece W (step S104).

Next, the calculating unit 16 calculates the rotation angle $\delta_n$ of the workpiece W when the cutting position $P_n$ ($Y_n$, $Z_n$) matches the vertex of the workpiece W (step S106). Then, the calculating unit 16 calculates the coordinate ($Yr_n$, $Zr_n$) of the cutting position $Pr_n$ when the workpiece W is rotated so that the cutting position $P_n$ ($Y_n$, $Z_n$) matches the vertex of the workpiece W (step S108).

Next, the control unit 12 controls the X drive unit 20X, the Y drive unit 20Y, the Z drive unit 20Z, and the R drive unit 20R to perform grooving (step S110: grooving step). Thereafter, the control unit 12 repeats the step of grooving in step S110 to sequentially form the grooves G on the surface $W_S$ of the workpiece W.

Note that, in the above embodiment, the case where the shape of the surface of the workpiece does not become a perfect circle shape due to the accuracy at the time of bending has been described, but the application range of the presently disclosed subject matter is not limited to workpieces whose shapes are deviated from the perfect circle shape. The presently disclosed subject matter can be applied to grooving on workpieces each having a curved surface shape that is convex on the outside (+Z side).

REFERENCE SIGNS LIST

1 . . . work processing device, 10 . . . control device, 12 . . . control unit, 14 . . . detecting unit, 16 . . . calculating unit, 18 . . . input/output unit, 20X . . . X drive unit, 20Y . . . Y drive unit, 20Z . . . Z drive unit, 20R . . . R drive unit, 22 . . . cutting unit, 24 . . . blade, 26 . . . sensor unit, 28 . . . workpiece supporting unit, 28R . . . rotary table, 30 . . . workpiece table

The invention claimed is:

1. A workpiece processing device for processing a workpiece having an outwardly-convex curved-surface-shape surface that is non-cylindrical shape surface, comprising:
 a workpiece supporting unit, including a rotary table, configured to support the workpiece so that the workpiece is rotatable around a first axis;
 a cutting unit having a blade configured to cut, the surface of the workpiece supported by the workpiece supporting unit;
 a sensor unit, including a sensor, configured to measure the surface of the workpiece; and
 a processor, including processing circuitry operatively connected to the workpiece supporting unit, the cutting unit, and the sensor unit, configured to:
  calculate the outwardly-convex curved-surface-shape surface that is non-cylindrical shape surface of the workpiece on a plane perpendicular to the first axis based on a measurement result of the surface of the workpiece; and
  rotate the workpiece around the first axis based on the calculated outwardly-convex curved-surface-shape surface that is non-cylindrical shape surface of the workpiece and a cutting position at which a groove is formed on the surface of the workpiece so that the cutting position matches a vertex in a direction along a second axis which is perpendicular to the first axis and parallel to the blade, and relatively move the workpiece supporting unit and the cutting unit, thereby forming a groove at the cutting position, the processor being configured to form the groove at the cutting position in a state that an incision direction of the blade and the first axis being capable of deviating from each other.

2. The workpiece processing device according to claim 1, wherein the processor is further configured to:
 calculate a normal line to the surface of the workpiece at the cutting position based on the outwardly-convex curved-surface-shape surface that is non-cylindrical shape surface of the workpiece, and
 rotate the workpiece around the first axis so that the normal line is parallel to a direction along a second axis which is perpendicular to the first axis and parallel to the blade, and relatively move the workpiece supporting unit and the cutting unit, thereby forming a groove at the cutting position.

3. The workpiece processing device according to claim 1, wherein the processor is further configured to:
 calculate a tangent line to the surface of the workpiece at the cutting position based on the outwardly-convex curved-surface-shape surface that is non-cylindrical shape surface of the workpiece, and
 rotate the workpiece around the first axis so that the tangent line is perpendicular to a direction along a second axis which is perpendicular to the first axis and parallel to the blade, and relatively move the workpiece supporting unit and the cutting unit, thereby forming a groove at the cutting position.

4. The workpiece processing device according to claim 1, further comprising
 a fixing surface on which the workpiece is fixed in the workpiece supporting unit, the fixing surface configured to be movable to adjust a cut-feeding direction of the blade.

* * * * *